US010289671B2

(12) United States Patent
Radakovitz et al.

(10) Patent No.: US 10,289,671 B2
(45) Date of Patent: May 14, 2019

(54) GRAPHICALLY DISPLAYING SELECTED DATA SOURCES WITHIN A GRID

(75) Inventors: Samuel Chow Radakovitz, Redmond, WA (US); Adam Michael Buerman, Bellevue, WA (US); Anupam Garg, Redmond, WA (US); Matthew John Androski, Bellevue, WA (US); Matthew Kevin Becker, Kirkland, WA (US); Brian S. Ruble, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 804 days.

(21) Appl. No.: 12/116,884

(22) Filed: May 7, 2008

(65) Prior Publication Data

US 2009/0282325 A1 Nov. 12, 2009

(51) Int. Cl.
*G06F 17/24* (2006.01)

(52) U.S. Cl.
CPC .................................. *G06F 17/246* (2013.01)

(58) Field of Classification Search
CPC ..... G06F 17/246; G06F 17/245; G06F 17/241
USPC ........ 715/212, 273, 200, 236, 217; 345/440; 707/999.01, 999.2, 999.104
See application file for complete search history.

(56) References Cited

U.S. PATENT DOCUMENTS 5,226,118 A 7/1993 Baker et al. .................. 395/161
5,581,677 A * 12/1996 Myers .................. G06T 11/206 345/440
5,721,847 A 2/1998 Johnson ........................ 395/333
6,016,502 A 1/2000 Haneda et al. ............... 707/509
6,031,530 A * 2/2000 Trueblood ............ G06F 3/0481 715/791
6,252,595 B1 * 6/2001 Birmingham ......... G06F 3/0481 715/803
6,701,485 B1 * 3/2004 Igra et al. ..................... 715/210
6,704,016 B1 * 3/2004 Oliver et al. ............. 345/440.2
6,901,407 B2 5/2005 Curns et al. .................. 707/102
7,176,925 B2 2/2007 Davis et al. .................. 345/441
7,830,382 B2 11/2010 Cirit et al.
7,831,928 B1 * 11/2010 Rose et al. .................... 715/810
8,122,369 B2 * 2/2012 Bissantz ............... G06F 17/246 715/774

(Continued)

OTHER PUBLICATIONS

Connectcode; SparkCode—Create Sparklines Dashboard reports in Microsoft Excel; 2007; http://replay.waybackmachine.org/20080415150057/http://www.spreadsheetml.com/sparklines.html.*

(Continued)

*Primary Examiner* — Manglesh M Patel
*Assistant Examiner* — Nicholas Hasty
(74) *Attorney, Agent, or Firm* — Merchant & Gould

(57) ABSTRACT

A sparkline is associated with a location in a document to provide a visual representation of one or more data values included in the document. The sparkline is associated with a data source within the document including the one or more data values. The sparkline is generated by generating the visual representation based on the one or more data values with a matrix of points to be presented at the associated location in the document. The sparkline is presented at the associated location in the document. The sparkline is configured to be regenerated when one or more of the data values in the data source change.

20 Claims, 31 Drawing Sheets

(56) References Cited

U.S. PATENT DOCUMENTS

| | | | | |
|---|---|---|---|---|
| 2002/0091728 | A1 | 7/2002 | Kjaer et al. | 715/212 |
| 2004/0143788 | A1 | 7/2004 | Aureglia et al. | 715/215 |
| 2004/0196286 | A1* | 10/2004 | Guzik | 345/440 |
| 2005/0210372 | A1* | 9/2005 | Kraft et al. | 715/509 |
| 2006/0149778 | A1 | 7/2006 | Clover | 707/102 |
| 2007/0124696 | A1 | 5/2007 | Mullender et al. | 715/781 |
| 2007/0253613 | A1* | 11/2007 | Bissantz | 382/131 |
| 2008/0016041 | A1* | 1/2008 | Frost | G06F 17/246 |
| 2008/0040372 | A1* | 2/2008 | Bissantz | 707/101 |
| 2008/0117213 | A1* | 5/2008 | Cirit et al. | 345/440 |
| 2008/0183445 | A1* | 7/2008 | Bissantz | 703/2 |
| 2009/0210789 | A1* | 8/2009 | Thakkar et al. | 715/719 |

OTHER PUBLICATIONS

Bissantz, "SparkMaker 4.0—Sparklines for Excel, Word, PowerPoint, and Html documents", https://web.archive.org/web/20080418224751/http://www.bissantz.com/sparkmaker/index_en.asp.*

Tufte, E.; "*Sparklines: theory and practice*"; http://www.edwardtufte.com/bboard/q-and-a-fetch-msg?msg_id=0001OR&topic_id=1; May 27, 2004; 43 Pgs.

Adar, E., et al.; "*Why We Search: Visualizing and Predicting User Behavior*"; http://delivery.acm.org/10.1145/1250000/1242595/p161-adar.pdf?key1=1242595&key2=4497464811&coll=GUIDE&d1=GUIDE&CFID=28635589&CFTOKEN=35617488; My 8-12, 2007; pp. 161-170.

Keller, J.; *Protest Letter* dated Jan. 26, 2010; BoxTone Incorporated; 1 pg.

BoxTone Incorporation; "*ProActive Mobile User Management for Blackberry*"; Jan. 2007; RIM/Blackberry Technical Conference; 9 pgs.

BoxTone Incorporated; "*BoxTone Version 3.0— Ops Dashboard and HandHeld Ops Dashboard User's Guide*"; Apr. 2007; 14 pgs.

Ruckstuhl, K.; *Protest Letter* dated Feb. 5, 2010; 5 pgs.

Truve, S.; "*Dynamic What-If Analysis: Exploring Computational Dependencies with Slidercells and Micrographs*"; May 7-11, 1995; CHI '95 Mosaic of Creativity, pp. 280-281.

Byers, J.; "*What Are Sparklines?*"; Sparkline PHP Graphing Library; 2010; accessed from http://sparkline.org/ on May 13, 2010; 2 pgs.

Byers, J.; *Sparkline— Home* at http://sparkline.wikispaces.com/; accessed May 13, 2010; 4 pgs.

ConnectCode Pte Ltd.; "*SparkCode—Create Sparklines Dashboard Reports in Microsoft® Excel®*"; accessed at http://www.spreadsheetml.com/sparklines.html on May 13, 2010; 4 pgs.

Payema/Google Doodle repository; "*The How to site—office tips, CSS, PHP, MySQL scripting and web publishing*"; 2009; accessed at http://www.bloggpro.com?s=nanocharts on May 13, 2010 2 pgs.

"*Sparklines for Excel*" accessed at http://sparklines-excel.blogspot.com/ on May 13, 2010; 10 pgs.

Kusleika, D.; "*Daily Dose of Excel*"; Sep. 13, 2006; accessed at http://www.dailydoseofexcel.com/archives/2006/09/13/scaled-in-cell-charting/ on May 13, 2010; 17 pgs.

Van Gelder, R.; "*Daily Dose of Excel*"; Feb. 5, 2006; accessed at http://www.dailydoseofexcel.com/archives/2006/02/05/in-cell-charting/ on May 13, 2010; 41 pgs.

Tufte, E.; "*Beautiful Evidence*"; Graphics Press LLC; © 2006, 2nd Printing, Jan. 2007; ISBN 978-0-9613921-7-8 (entire book).

Van Gelder, R.; "*In Cell Charting*"; Daily Dose of Excel blog; Feb. 5, 2006; accessed via internet on Dec. 7, 2009 at http://www.dailydoseofexcel.com/archives/2006/02/05/in-cell-charting; 40 pgs.

Connectcode; "*SparkCode—Create Sparklines Dashboard Reports in Microsoft® Excel®*"; 2007; accessed via internet on Dec. 31, 2009 at http://www.spreadsheetml.com/sparklines.html; 4 pgs.

Connectcode; "*TinyGraphs Excel Add In*"; 2007; accessed via internet on Dec. 31, 2009 at http://www.spreadsheetml.com/products.html; 4 pgs.

Chitu, Alex, "Google Finance Stock Screener", Published on: Apr. 1, 2008, Available at: http://googlesystem.blogspot.in/2008/04/google-finance-stock-screener.html.

Bill, "In-Cell Spreadsheet Graphs", Published on: Sep. 23, 2007, Available at: http://techrageo.us/2007/09/23/in-cell-spreadsheet-graphs/.

Popov, Dmitri, "Pepping up OOo Writer Documents with Sparklines", Published on: Dec. 11, 2006, Available at: http://archive09.linux.com/feature/58814.

Gemignani, Chris, "More on Excel in-cell Graphing", Published on: Aug. 2, 2006, Available at: http://www.juiceanalytics.com/writing/more-on-excel-in-cell-graphing/.

"EditGrid Crunchies Special Release", Published on: Jan. 18, 2008, Available at: http://blog.editgrid.com/tags/articles/news/page/2.

Davis, Kate, "SparkLines Using SAS and JMP", In Proceedings of NorthEast SAS Users Group Conferences, Nov. 11, 2007, 6 pages.

"Sparklines—Another Masterpiece of Edward Tufte", Published on: Jul. 17, 2007, Available at: http://www.bissantz.com/sparklines/.

"Excel Add-in: Creates Sparklines and Mini Column Graphs", Published on: Aug. 28, 2007, Available at: http://www.everydayspace.org/2007/08/28/excel-add-in-creates-sparklines-and-mini-column-graphs/.

Vera, Nico, "Pimp My Privacy", Published on: Jan. 24, 2007, Available at: https://blog.facebook.com/blog.php?post=2231037130.

* cited by examiner

1500

SPREADSHEET #1.XLS

Edit Location & Data

Group

Ungroup

Sparkline Color

Accent Color

Horizontal Axis

Vertical Axis

| | A | B | C | D | E | F | G |
|---|---|---|---|---|---|---|---|
| 1 | | | | | | | |
| 2 | ENTRY | January | February | March | | | |
| 3 | ABC | 10,122 | | 13,215 | | | |
| 4 | DEF | 6,442 | 6,751 | 8,120 | | | |
| 5 | GHI | 1,680 | 4,510 | 1,095 | | | |
| 6 | JKL | 9,775 | 10,056 | 13,215 | | | |
| 7 | MNO | 4,661 | 6,463 | 10,120 | | | |
| 8 | PQR | 1,984 | 2,002 | 2,899 | | | |
| 9 | | | | | | | |
| 10 | | | | | | | |
| 11 | | | | | | | |
| 12 | | | | | | | |
| 13 | | | | | | | |
| 14 | | | | | | | |

GRAPHICALLY DISPLAYING SELECTED DATA SOURCES WITHIN A GRID

BACKGROUND

Sparklines are small graphics embedded in a document, such as a text document or a spreadsheet, among the words, numbers, images or other content of the document. Sparklines can be used to graphically represent the content of one or more neighboring cells to provide a visual representation of the data. There are at least two advantages to using sparklines. First, as a "picture paints a thousand words," at a glance, a graph can quickly clearly show values, trends, and similar information. Second, by presenting such a graph in context within the document as opposed to presenting the graph on a separate page or screen, a viewer can more readily appreciate the information represented and/or compare the represented information with that represented by other sparklines.

In the case of creating sparkline graphs, conventionally, sparklines are created manually, often by simulating the generation of bars with a set of segment fonts that represent parts of bars, lines, or other graph features. Alternatively, a user could manually could select data and manually generate a chart, then try to scale the chart to fit the desired space.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A sparkline provides a visual representation of one or more data values included in the document. The sparkline is generated by generating the visual representation based on the one or more data values with a matrix of points to be presented at the associated location in the document. The sparkline is presented at the associated location in the document. The sparkline is configured to be regenerated when one or more of the data values in the data source change.

These and other features and advantages will be apparent from reading the following detailed description and reviewing the associated drawings. It is to be understood that both the foregoing general description and the following detailed description are explanatory only and are not restrictive. Among other things, the various embodiments described herein may be embodied as methods, devices, or a combination thereof. Likewise, the various embodiments may take the form of an entirely hardware embodiment, an entirely software embodiment or an embodiment combining software and hardware aspects. The disclosure herein is, therefore, not to be taken in a limiting sense.

BRIEF DESCRIPTION OF THE DRAWINGS

FIGS. 2-27 are screen views of an application in which a sparkline is created or modified within the document;

DETAILED DESCRIPTION OF IMPLEMENTATIONS

This detailed description describes implementations of generating sparklines within a grid or structure of a document. As explained in detail below, implementations of the present disclosure allow for a user to select a data source including one or more data values to be represented in a sparkline as well as the form and visual attributes of the sparkline. In one implementation, a user can select the data source and then initiate the sparkline generation facility or vice versa. Implementations of the present disclosure allow a user to manipulate generation of the sparkline and/or modify sparklines using a graphical interface accessible through an on-screen interface or ribbon, dialog boxes, pull-down menus, and other interfaces.

Implementations of the present disclosure for generating the sparkline use a charting engine, such as a same charting engine of an application, to generate the sparkline. However, instead of generating a chart that has to be scaled or otherwise modified to fit a desired location, the charting engine is configured to generate the sparkline in a scale to fit the sparkline location. The charting engine generates the sparkline as a matrix of points to be presented in the sparkline location.

Implementations of the present disclosure associate the sparkline with a relative definition of the data source so that, if the data source and/or the sparkline location are moved, the sparkline will be associated with the same data source. Alternatively, the sparkline can be associated with a fixed representation and/or fixed to a current data set so that a current generation of the sparkline may be moved or copied to another location, another document, or another application without being tied to the data source from which the sparkline was generated.

Implementations of the present disclosure allow for transparency within the sparkline location allowing the sparkline to be superimposed upon other information or have other information superimposed on the sparkline. Implementations of the present disclosure also allow sparklines to be generated and/or modified in groups. In other words, if a data source is selected that includes multiple sets of data, sparklines for each of the data sets can be generated at the same time. Correspondingly, when sparklines are so grouped, implementations of the present disclosure apply changes to one of the sparklines to other sparklines in the group.

Illustrative Operating Environment

Figure 1:
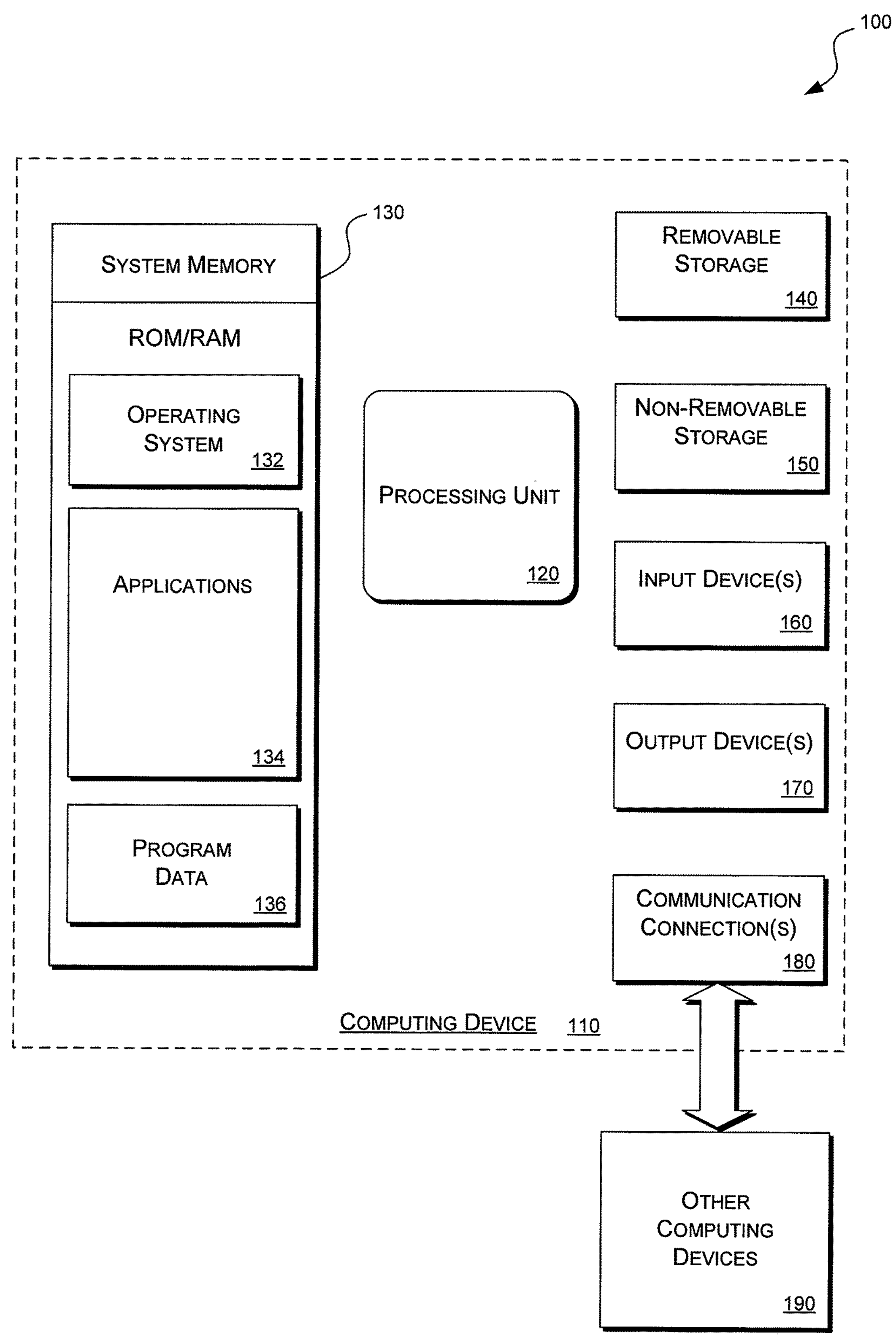
FIG. 1 is a block diagram of an operating environment supporting computer-implemented methods and computer-readable media implementations of the present disclosure.

FIG. 1 is a block diagram of a representative operating environment 100 operable to support computer-implemented methods and computer-readable media as herein described. The operating environment is representative of both a client computing system operable to generate and manipulate sparklines and/or a server supporting one or more client computing systems.

Referring to FIG. 1, an exemplary operating environment 100 includes a computing device 102. In a basic configuration, the computing device 102 may include any of a number of forms of stationary or mobile computing devices. The computing device 102 typically includes at least one processing unit 104 and a system memory 106. Depending on the exact configuration and type of computing device, the system memory 106 may be volatile (such as RAM), non-volatile (such as ROM, flash memory, and the like) or some combination of the two. The system memory 106 typically maintains an operating system 108, one or more applications 110, and program data 112.

The computing device 102 may also have additional features or functionality. For example, the computing device 102 may also include additional data storage devices (removable and/or non-removable) such as, for example, magnetic disks, optical disks, nonvolatile memory storage, and other types of storage devices. Such additional storage is illustrated in FIG. 1 by removable storage 114 and non-removable storage 116. Computer storage media may include volatile and non-volatile, removable and non-removable media implemented in any method or technology for storage of information, such as computer readable instructions, data structures, program modules or other data. The system memory 106, the removable storage 114, and the non-removable storage 116 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 102. Any such computer storage media may be part of the computing device 102. The computing device 102 may also have input device(s) 118 such as a keyboard, mouse, pen, voice input device, touch input device, etc. Output device(s) 120 such as a display, speakers, printer, etc., may also be included.

The computing device 102 also may include one or more communication connections 122 that allow the computing device 102 to communicate with other computing devices 124, such as over a network or a wireless network. The one or more communication connections 122 are an example of communication media. Available forms of communication media typically carry computer readable instructions, data structures, program modules or other data in a modulated data signal such as a carrier wave or other transport mechanism and includes any information delivery media. The term “modulated data signal” may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Generation of Sparklines

Implementations of the present disclosure allow for a user to select a data source including one or more data values to be represented in a sparkline and then generate the sparkline for a location the user specifies. A single sparkline can be generated for a single set of data or a plurality of sparklines can be generated for a group of data sets.

Figure 2:
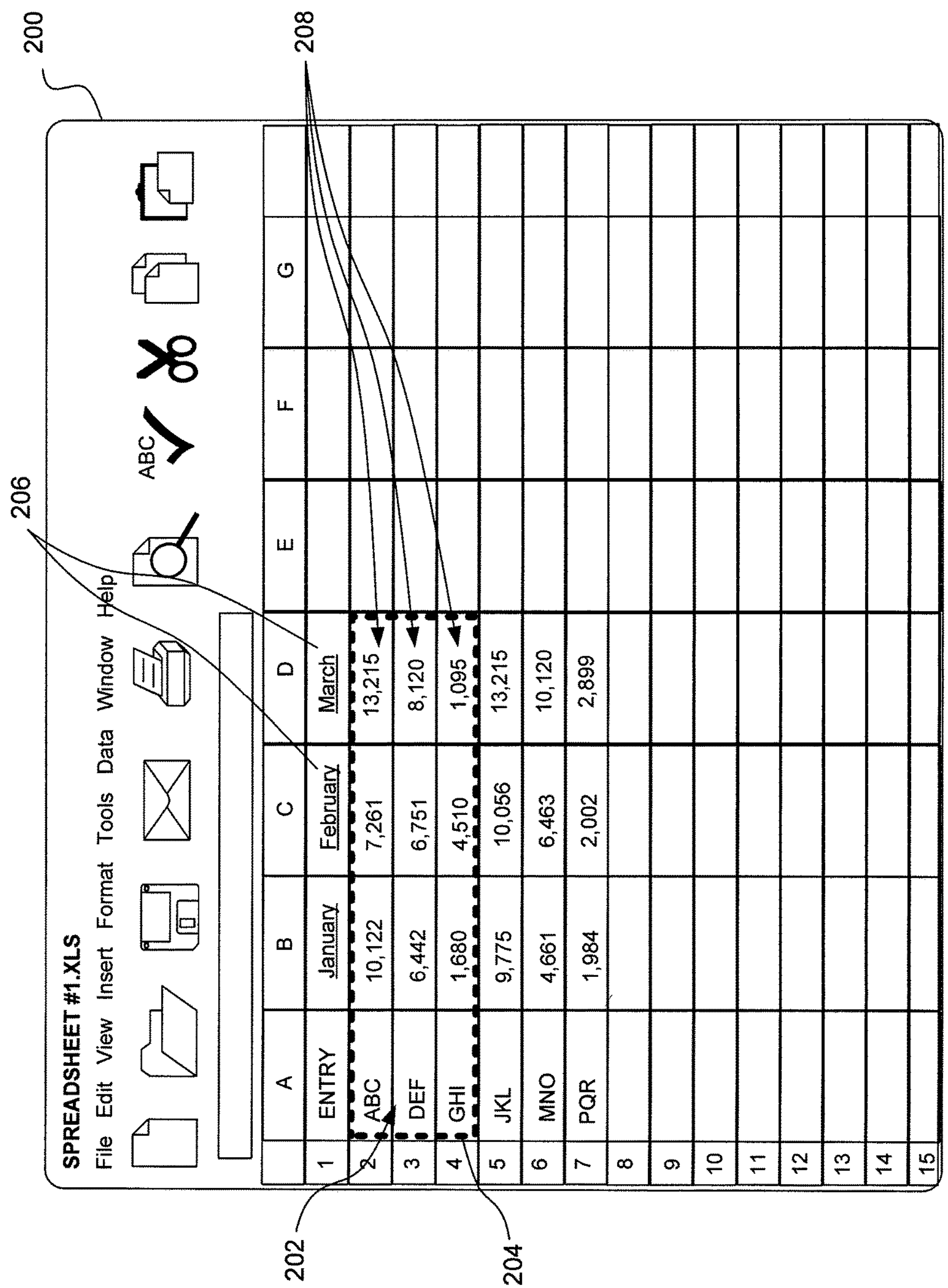

FIG. 2 is a screen view 200 of an application that will be used to illustrate generation and manipulation of sparklines according to the present disclosure. In this example, the application is a spreadsheet application, such as Microsoft Excel® produced by Microsoft Corporation of Redmond, Wash. However, the generation and modification of sparklines also may be implemented in word processing applications, database applications, presentation applications, and other applications, whether the applications are network-based, host-based, or workstation-based.

In FIG. 2, a plurality of data values 202 are highlighted with a dotted line 204 to select the data values 202 as a group of data sources for which sparklines will be generated. The spreadsheet includes a plurality of data sets for data over a period of months 206. The data could represent any quantity, such as stock prices, inventory levels, profits, sports statistics, or any other values. In the following example, a sparkline will be generated for the data values in each of the rows 208. Each of the rows may be regarded as an independent data source from which a sparkline will be generated. However, this is just one example: data sets may include columns or other identified sets of data.

Figure 3:
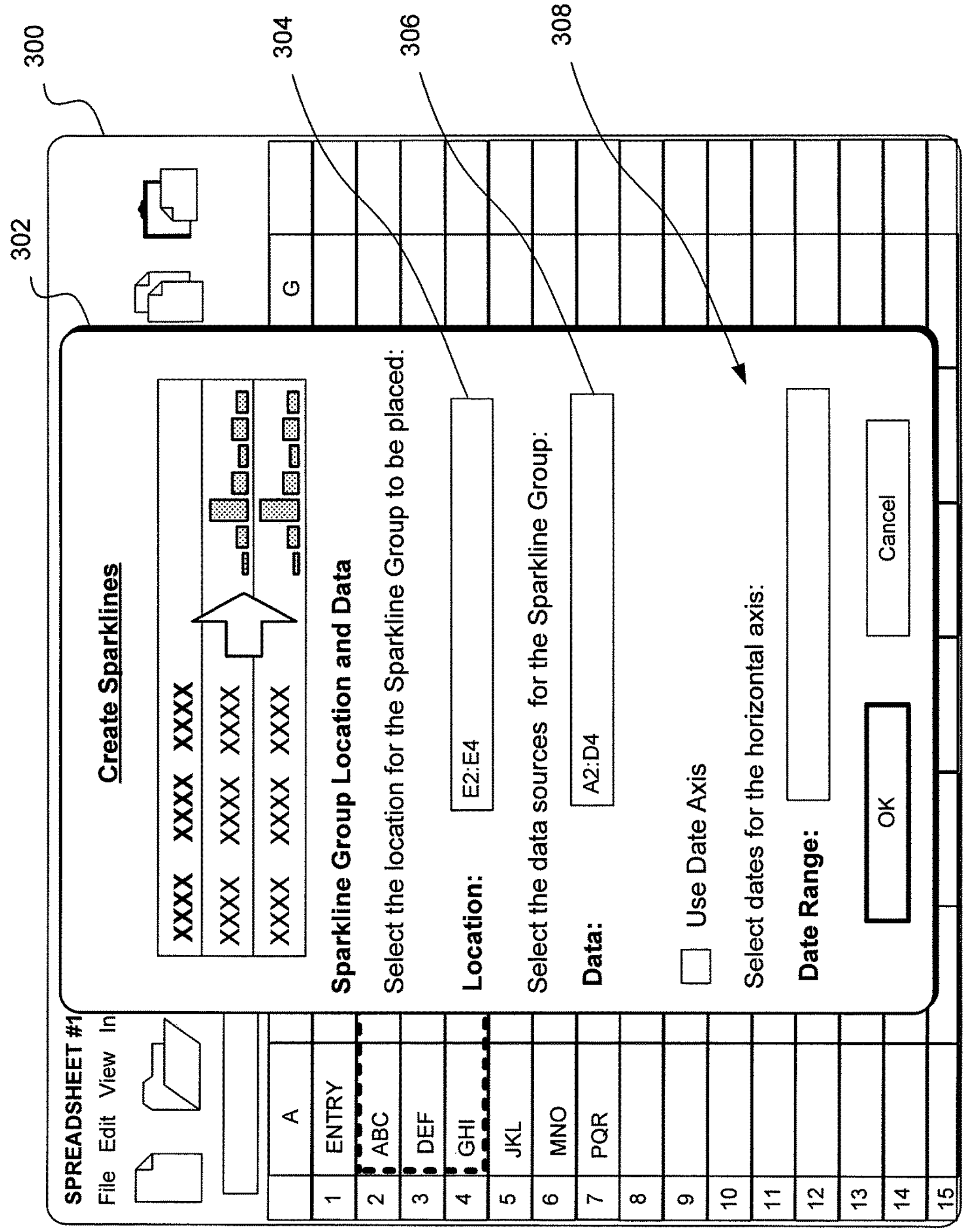

FIG. 3 is a screen view 300 of the application of FIG. 2 in which a dialog box 302 for creating sparklines has been invoked. The dialog box 302 provides a location input 304 allowing for user to specify one or more locations in which the sparklines will be presented. The dialog box 302 also includes a data input 306 allowing the user to specify the location of the data sources from which the sparklines will be generated. The dialog box 302 also illustrates an option for user to specify a date axis within the data source to be used in generating the spark lines. Implementations of the present disclosure may include recognition of data ranges that, for example, allow for the recognition of missing data points when a data value is missing for one or more dates in the date range, as will be described further below.

The dialog box 302 may be invoked in any number of ways. The dialog box 302 may have been invoked from a drop-down menu, from a menu invoked by manipulating from a pointing device (e.g., such as by clicking a right-hand button of a mouse or other pointing device), from a ribbon interface, as will be described further below, by pressing a function key or a hot-key combination, or by any other method for invoking a function on a computing device.

In FIG. 3, the data input 306 shows that the data ranges selected in FIG. 2 are assumed to be the data sources for the sparklines to be created. Because the data ranges selected in FIG. 2 were selected when the dialog box 302 was invoked, an implementation of the present disclosure defaults to using the previously specified data ranges as the data sources. However, a user also could manually enter data sources and/or modify any default data ranges included in the data input 306. correspondingly, implementations of the present disclosure may supply a default location in the location and put 304 for the presentations of the sparklines. In the example of FIG. 3, the locations are assumed to be the cells at the ends of the Rose specified as the data sources. Again, a user also could manually enter and/or edit default locations included in the location input 304.

Implementations of the present disclosure may default and/or be receptive to relative references for identifying the data sources and/or sparkline locations. In this way, as is familiar to users of spreadsheet applications, moving a data source or a sparkline will allow the Association between the data source and the sparkline to continue even though an absolute location of the data source and/or the sparkline changes. The use of relative references also simplifies the copying or replication of sparklines based on a type of data stores in a way that also is familiar to users of spreadsheet applications. Alternatively, either as a default or as a matter of a user option, absolute references could be used to tie a data source and/or a sparkline to a specific point in a document. In any case, once a user is satisfied with the data entered in the dialog box 302, a user can accept the data entered and thereby generate the sparklines.

Figure 4:
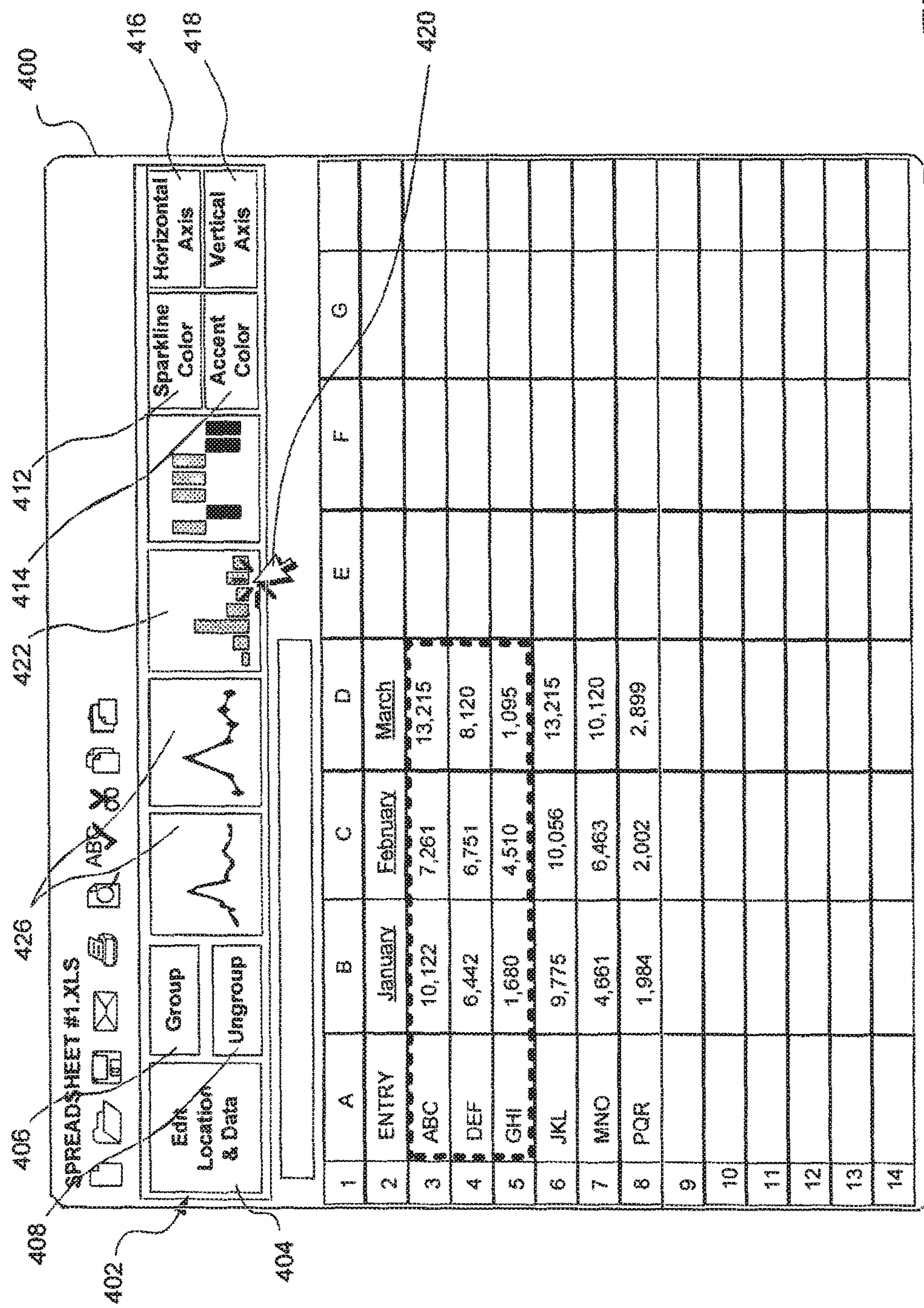

FIG. 4 is a screen view 400 of an application screen similar to that of FIG. 2 except that the screen view 400 shows the application presenting a ribbon interface 402 across the top of the screen. The ribbon interface 402 may simplify tasks for a user by allowing a user to engage functions by selecting one of a plurality of on screen buttons rather than by using pull-down menus or other processes for initiating functions.

In the example of FIG. 4, the ribbon interface 402 includes buttons for editing sparkline location and data, which may invoke a dialog box 302 (FIG. 3). The ribbon interface 402 also may include buttons to group 406 and ungroup 408 groups of data sources and/or sparklines as will be described further below.

The ribbon interface 402 may present buttons displaying a plurality of commonly used sparkline types 426. The sparkline types 426 shown in the ribbon interface 402 may be the result of program defaults and/or user-specified preferences. The types of sparklines that may be generated and/or shown on the interface may include line graphs, line graphs with value markers, bar graphs, stacked bar graphs, win/loss graphs, pie charts, or any type of graphical representation of information.

The ribbon interface 402 also may include buttons to select a sparkline color 412, and accept color for the location of the sparkline 414, were buttons to change options for the horizontal axis 416 and/or the vertical axis 418.

From a ribbon interface 402, a user may select one of the functions associated with one of the plurality of buttons by manipulating a pointing device (not shown) to direct a cursor 420 to a selected button and then selecting that button. In the example of FIG. 4, a user uses the cursor 420 to select a bar chart icon 422 to generate bar chart-type sparklines for the data sources previously selected (FIG. 2). Thus, a ribbon interface for controlling sparklines allows the user to generate at least an initial set of sparklines without invoking other menus or dialog boxes such as dialog box 302 (FIG. 3).

Figure 5:
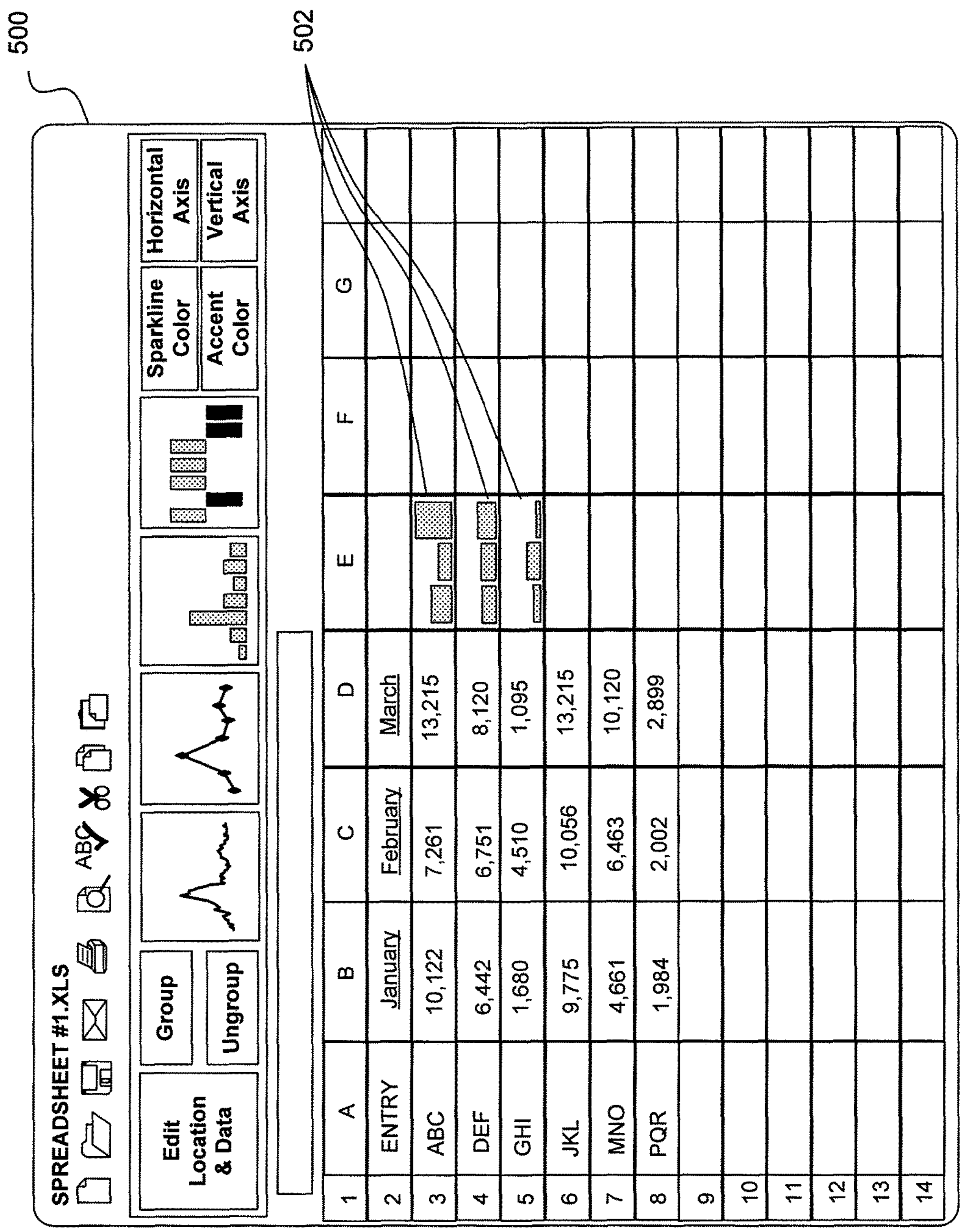

FIG. 5 is a screen view 500 of the application after a plurality of sparklines 502 to have been generated for the previously selected data sources. The plurality of sparklines 502 were present the data values in the data source associated with each of the respective sparklines. More specifically, each of the sparklines includes three bars representing the relative value of the three data values in each of the respective data sources. If the sparklines 502 were generated using the dialog box 302 (FIG. 3), although a bar chart format was not selected in the dialog box, the bar chart format may be a default set by the program or the user that the user could later modify. If the sparklines 502 generated using the ribbon interface 402 (FIG. 4), the bar chart format was invoked by the user selection of the bar chart button 422 from the ribbon interface 402.

As illustrated in FIGS. 2-5, sparklines 502 representing data values included in one or more data sources are easily created and presented in the document in the context of the data that the sparklines 502 represent. Thus, the sparklines 502 being presented within the grid of the spreadsheet including the data, a viewer can easily assimilate the data you can easily refer to the data values from which the sparklines 502 regenerated.

Modification of Sparklines

Implementations of the present disclosure allow both for automatic modification and updating of the sparklines as well as user-initiated modifications to the sparklines.

Figure 6:
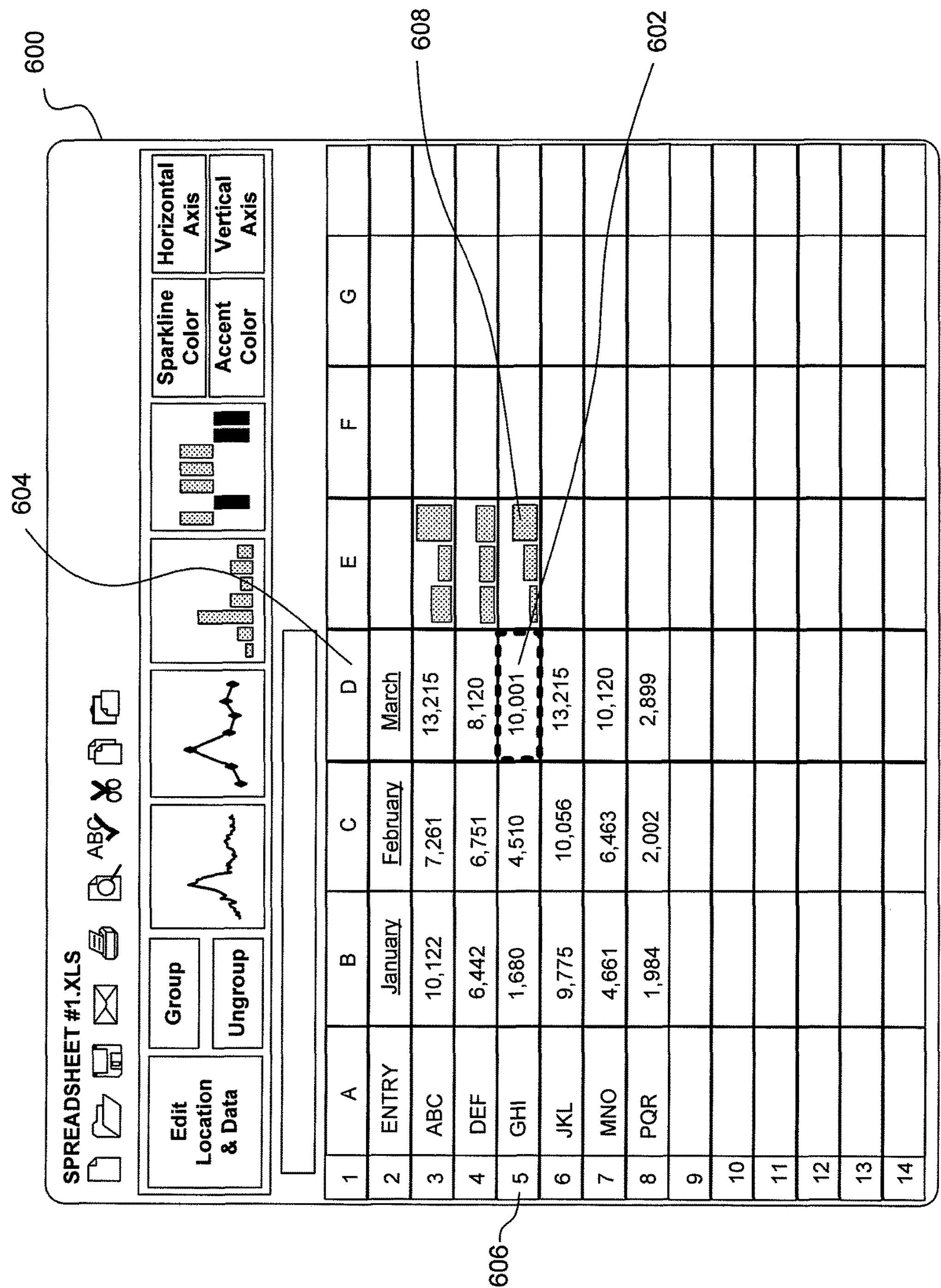

FIG. 6 is a screen view 600 of the application depicted in the previous FIGURES in which one of the data values is changed. Specifically, a value in cell 602 in column D 604 and row 5 606 is changed from a previous value of 1,095 (see, e.g., FIG. 5) to 10,001. By comparison of FIG. 6 with FIG. 5, one can see that the bar 608 representing the value in cell 602 has been changed to reflect the change in value. Implementations of the present disclosure provides for automatic updating of one or more sparklines one the one or more data values with which the sparklines are associated should change. Thus, when a sparkline is associated with a data source and one or more values in the data source change, implementations of the present disclosure update the sparklines without the user having to perform any manual tasks in recreating or regenerating the affected sparklines.

Figure 7:
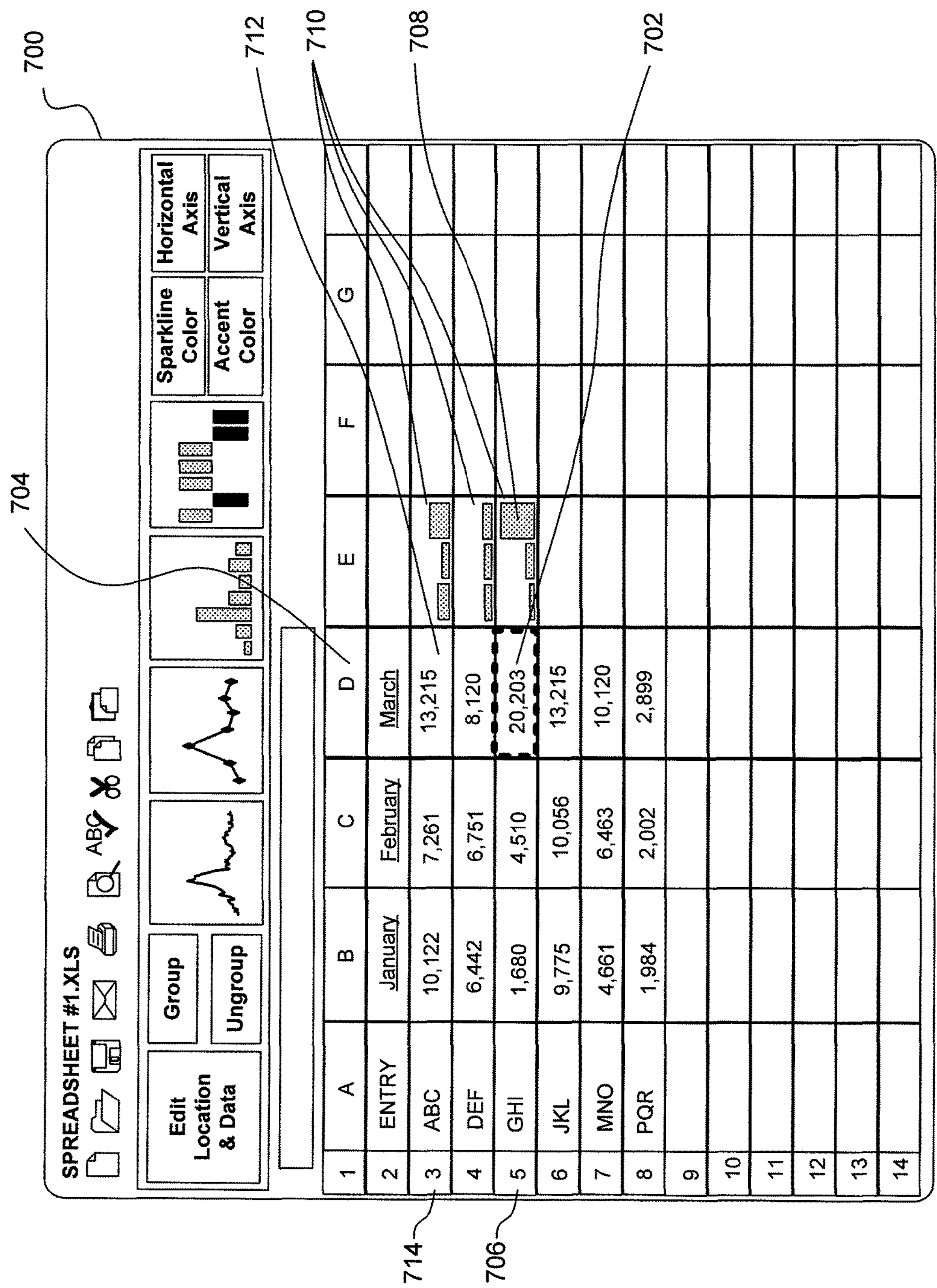

FIG. 7 is a screen view 700 of the application showing, as also further described below, that implementations of the present disclosure allow apply corresponding changes to other members of a group of sparklines when one or more changes in another data value or sparkline in the group indicates such a change. With reference to FIGS. 2-4, the sparklines of FIG. 5 were generated for a group of selected data sources. As a default and/or as a matter of user selection, the data sources and the resulting sparklines are associated in a group so that a change to one or more data values that may affect the sparklines of other groups are automatically applied to the other sparklines in the group.

In FIG. 7, the value in cell 702 in column D 704 and row 5 706 is changed from a previous value of 1,095 (see, e.g., FIG. 5) to 20,203. By comparison of FIG. 7 with FIG. 5 or FIG. 6, one can see that the bar 708 representing the value in cell 602 has been changed to reflect the change in value. However, with comparison to the other FIGURES, one can see that the scale of all of the sparklines 710 has changed. Before the change in the value in cell 702, the value in cell 712 in column 704 and row 714 of 13,215 was the largest value in the group of data sources and resulted in the tallest bar. Using that same scale, a bar representing the new value 20,203 in cell 702 would exceed the bounds of the cell in which the respective sparkline is presented. However, with the change in the value in cell 702, all of the grouped sparklines 710 are re-scaled. Thus, the grouped sparklines 710 are proportional to each other to present the relative values of all the data values in the selected data sources without manual intervention.

Figure 8:
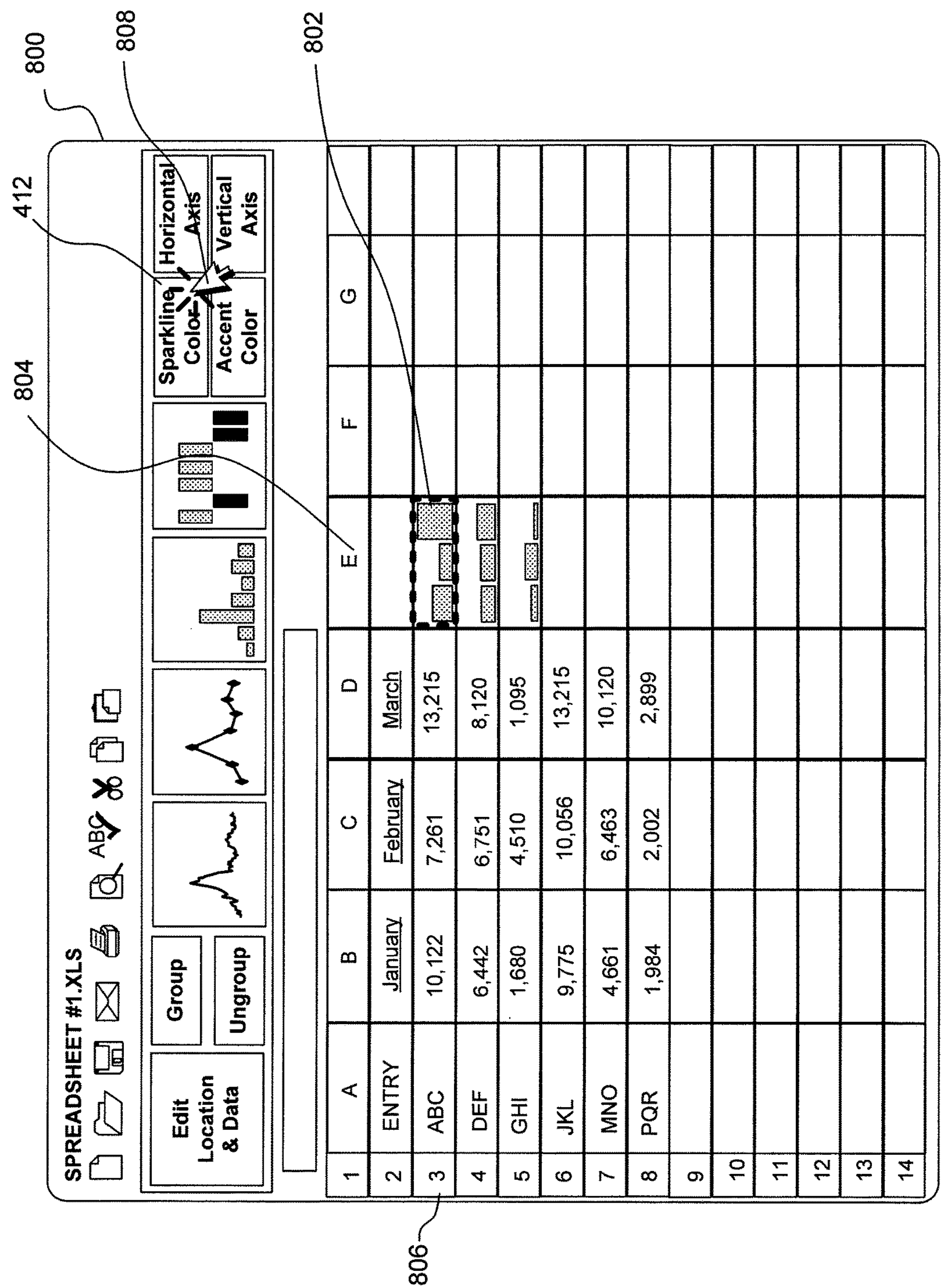

FIG. 8 is a screen view 800 of the application in which the user has selected the sparkline 802 in column E 804 and row 3 806 and then directs a cursor 808 to select the sparkline color button 412. Invoking the sparkline color button 412 may invoke a menu, dialog box, drop-down menu, or other interface displaying colors and/or patterns a user may select to change the appearance of one or more sparklines (not shown).

Figure 9:
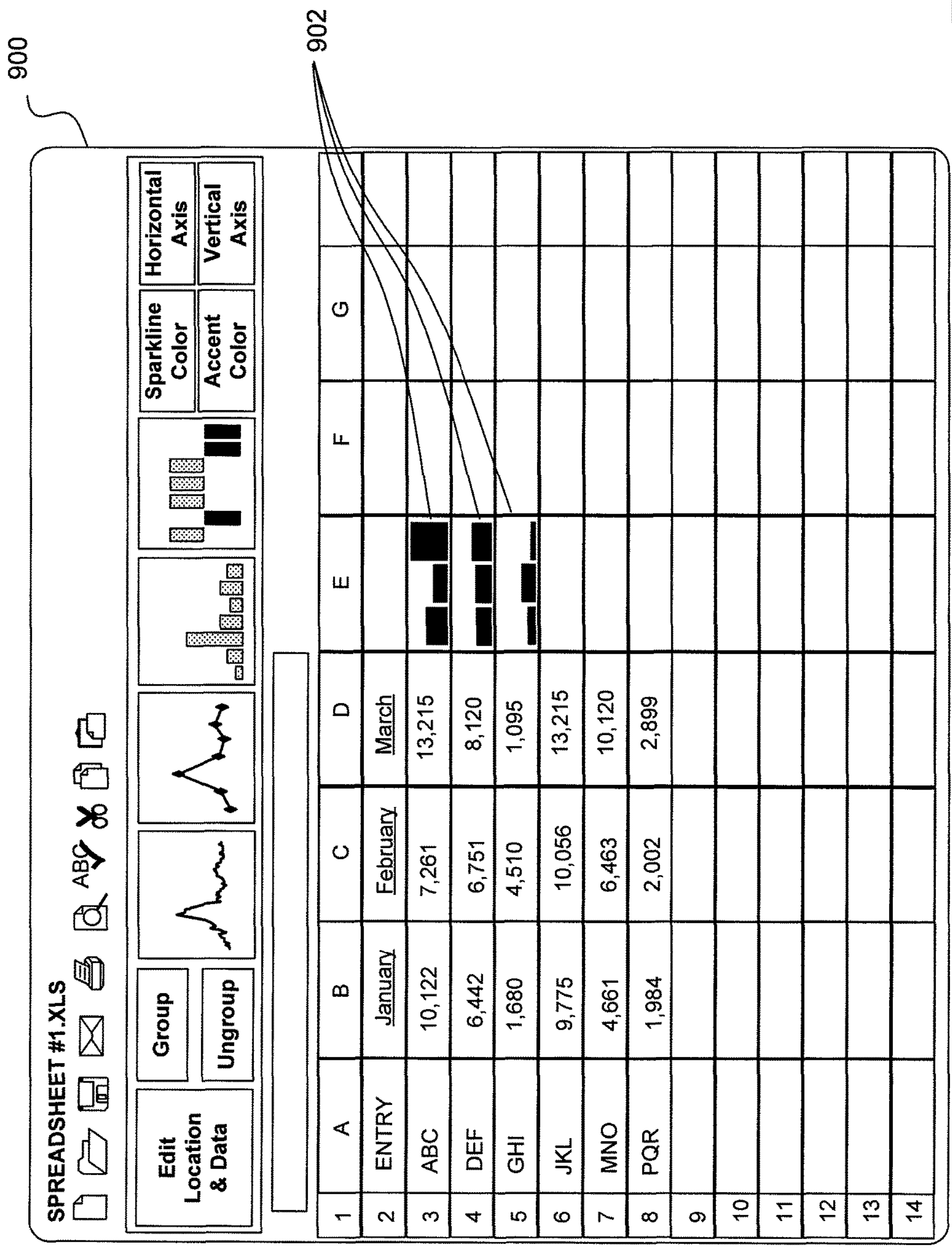

FIG. 9 is a screen view 900 of the application after the user has selected a new sparkline color. All of the sparklines 902 have changed to a new color even though only the sparkline in cell 802 (FIG. 8) was actually selected before the color change was made. According to implementations of the present disclosure, such format changes are carried over to other sparklines in the group, just as the scaling changes were made to other sparklines in the group as shown in FIG. 7. Thus, as long as sparklines are grouped, changes to any one of the sparklines in the group may be applied to all group members to insure consistency within the group.

As previously described with reference to FIGS. 2-4, generating sparklines for a group of data sources may result in the resulting sparklines being grouped as a default. Alternatively, as shown in FIG. 4, the user may have the option of manually grouping and ungrouping data sources and/or sparklines, such as by selecting one or more data sources and/or sparklines and selecting the appropriate group button 406 or ungroup button 408.

Figure 10:
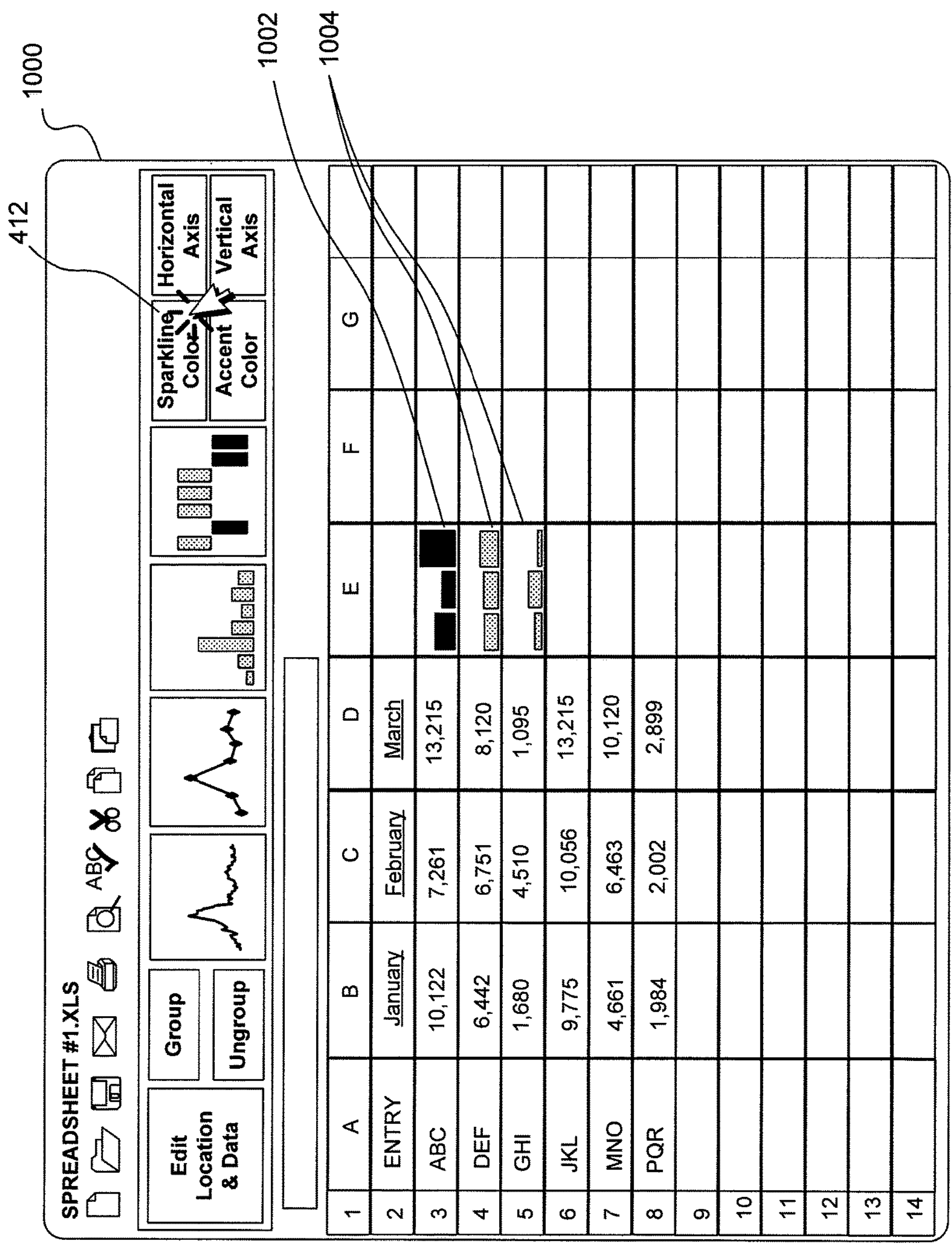

FIG. 10 is a screen view 1000 of resulting sparklines if the user had chosen to ungroup one or more of the sparklines before selecting a new color with the sparkline color button 412. In the example of FIG. 10 as compared with FIG. 9, the user has selected to apply a new color or pattern to sparkline 1002 while leaving the other sparklines 1004 in their original color or pattern. Thus, the user can choose to individually manipulate one or more presentation attributes, whether a color, pattern, scale, or other aspects of one or more of the sparklines rather than collectively manipulating a previously-grouped set of sparklines and/or associated data sources.

Overlapping and Transparency of Sparklines

Implementations of the present disclosure allow for additional content to be presented in a location presenting a sparkline. In addition to presenting the sparkline, the location may also present one or more of a formula, text, text; and image, location shading, a location color, an additional graphic representative of one or more quantities, or other information.

Implementations of the present disclosure may allow for such information to be overlaid or overlapped according to a default or user-selected hierarchy. For example, a text entry or a formula may be presented on top of a sparkline, while images, colors or shading may be in the background as a matter of default or as a matter of user selection. Alternatively, the sparkline or the additional content may be rendered with a level of transparency allowing for the sparkline and the additional content to both be visible simultaneously.

Figure 11:
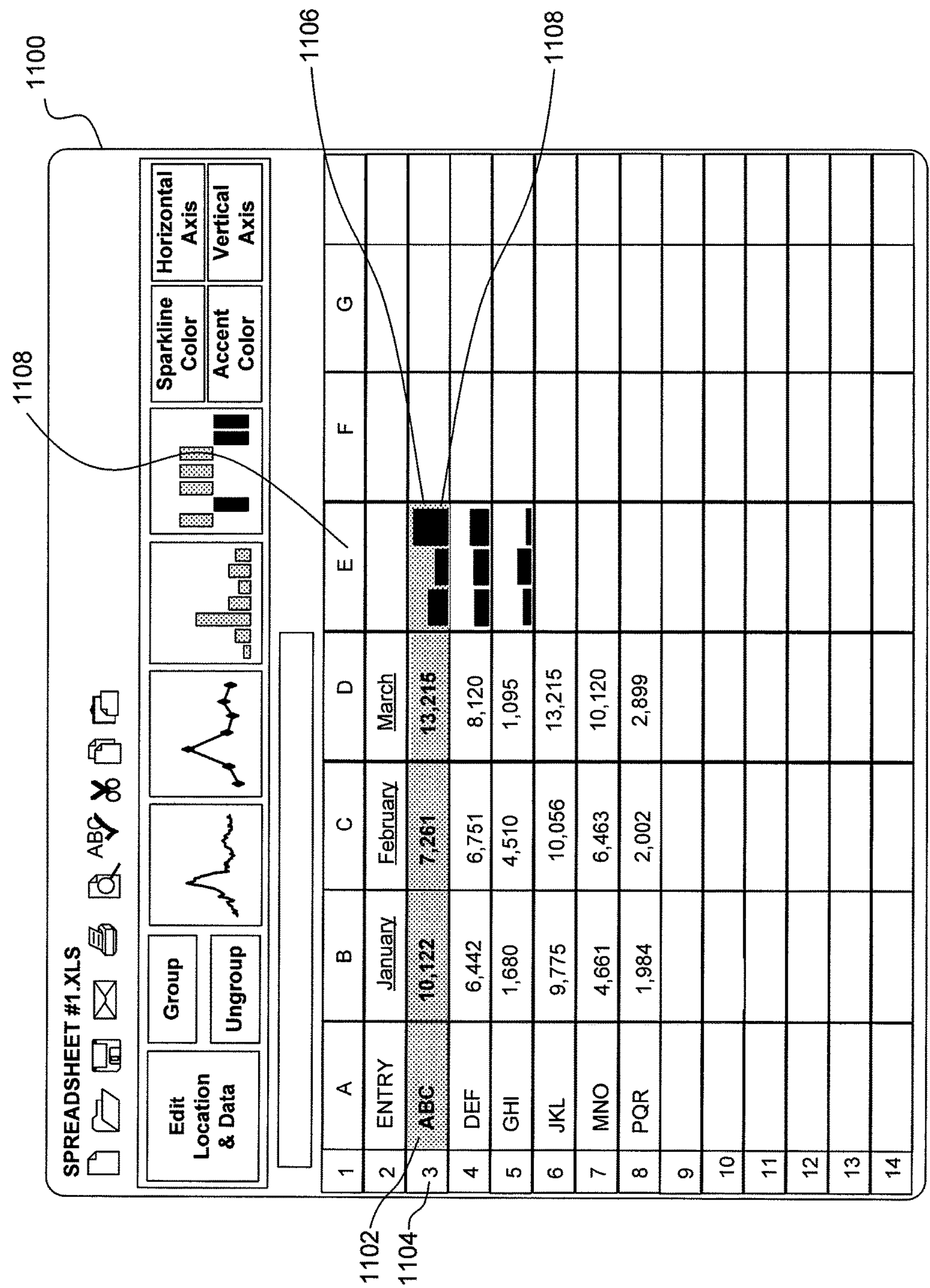

FIG. 11 is a screen view 1100 of an application screen in which a background color or shading 1102 has been applied to row 3 1104, whether to highlight row 3 1104 or for some other purpose. In the cell 1106 in column E 1108 of row 3 1104, whether as the result of transparency of the background color or shading 1102 or a preference to display the sparkline 1108 over the color or shading 1102, both the color or shading 1102 and the sparkline are visible. Similarly transparency and/or layering would allow for text, formulas, and other additional content to be visible in addition to the sparkline.

Figure 12:
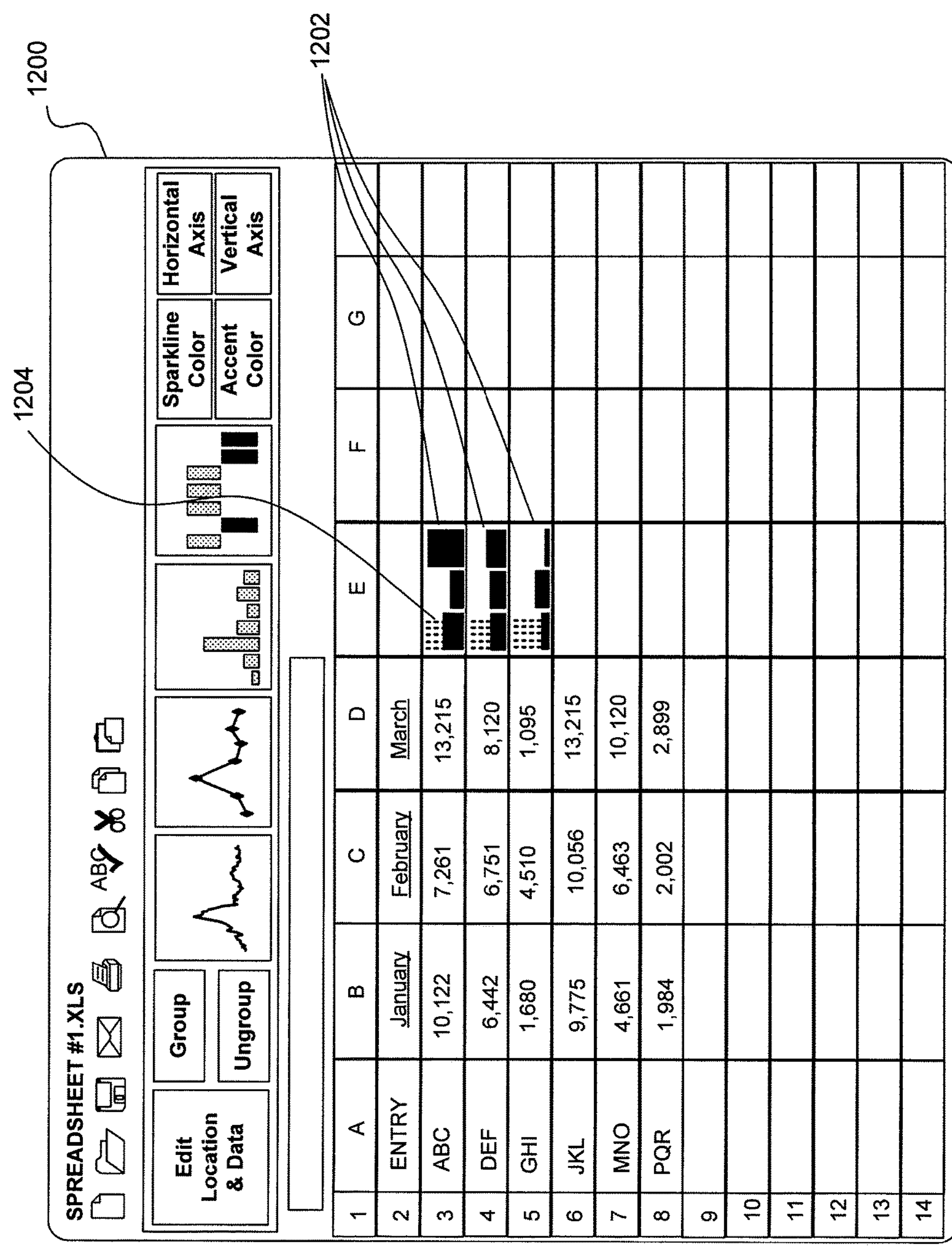

FIG. 12 is a screen view 1200 of another example of additional content being simultaneously viewable in a location presenting a sparkline. Specifically, in a number of locations 1202 presenting sparklines, additional graphics 1204 are presented. The graphics may represent an additional numeric quantity either associated with the data sources from which the sparklines were generated or from another data source. In the example of FIG. 12, the additional graphic is the same for each of the locations 1202 and includes vertical dashed lines across approximately one-quarter of the locations 1202 to indicate that the sparklines represent information for the first quarter of a current year. The additional graphic 1204 itself may represent a sparkline generated based on the three-month period represented in the data sources making up one-quarter of the current year. In any case, the additional content presented by the additional graphic 1204 is rendered in the background behind the sparklines or with a degree of transparency so as not to block view of the sparklines. Alternatively, the additional graphic 1204 could be overlapped, layered, or superimposed on top of the sparklines as desired. In any case, implementations of the present disclosure provide for locations presenting one or more sparklines and one or more additional content features being displayable and viewable in the same location.

Treatment of Zero, Blank or Null Data Values

Implementations of the present disclosure provide for default and/or selectable treatment of zero, blank, or null data in a data source. By default and/or by user option, blank or null values may be treated in different ways.

Figure 13:
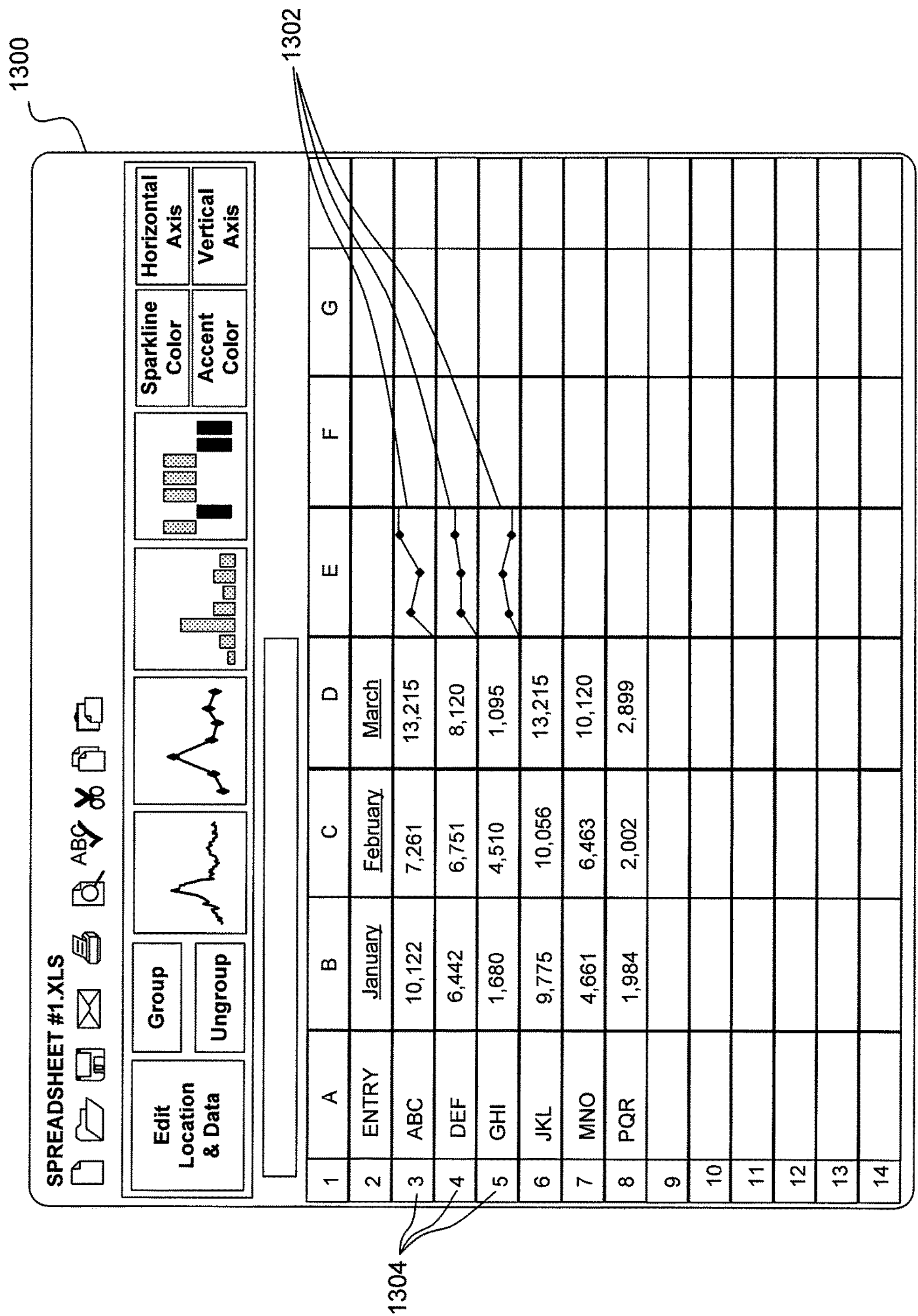

FIG. 13 is a screen view of an application 1300 in which a plurality of line graph-type sparklines 1302 are presented for a set of data sources. The line graph sparklines 1302 represent the data values in respective rows 1304 that constitute the data sources for each of the sparklines 1302 as in the previous examples. It is noted that each of the rows 1304 include complete, non-zero data values associated with each of the sparklines.

Figure 14:
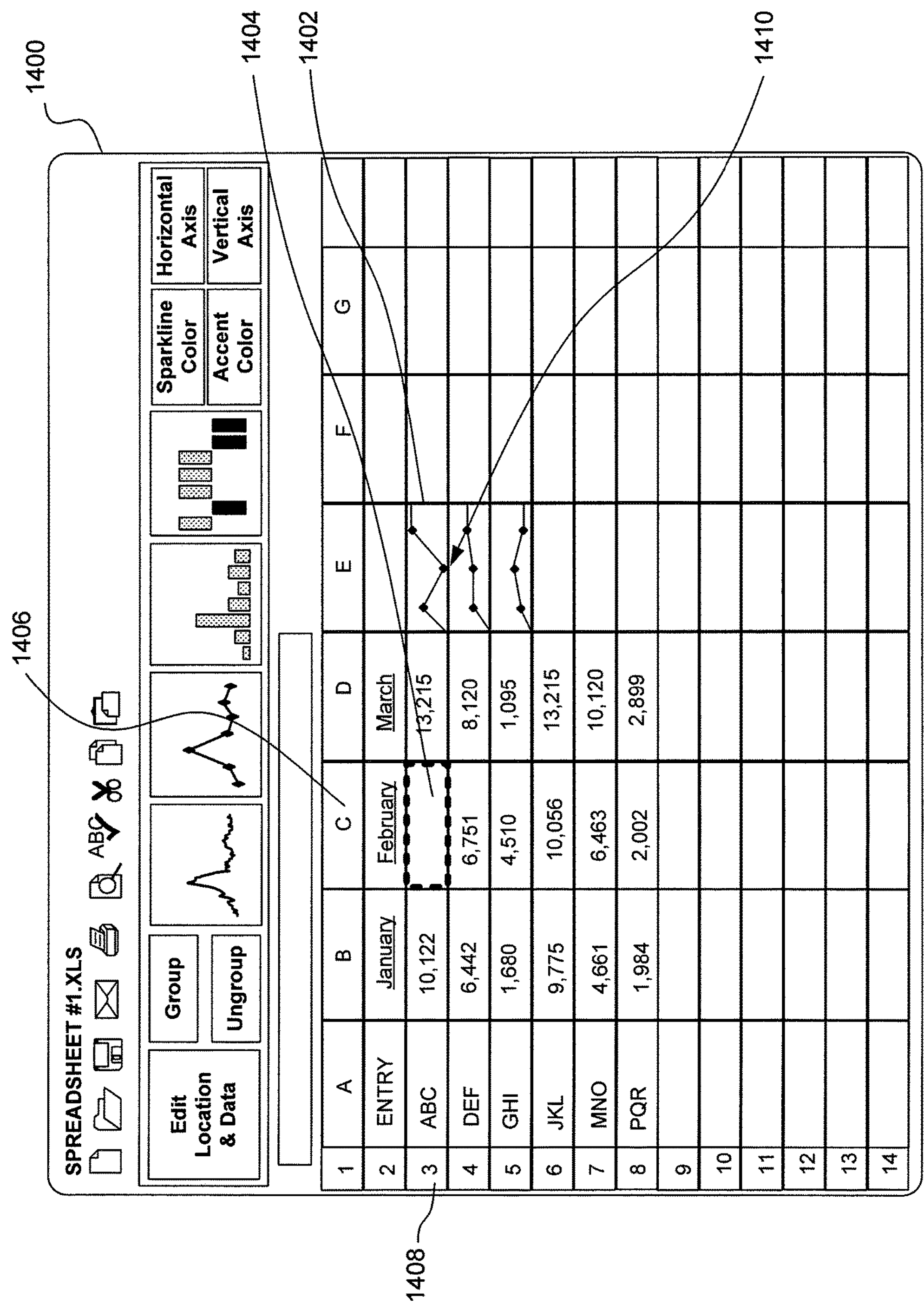

FIG. 14 is a screen view of the application of FIG. 13 in which a null or blank value is treated as a zero. A sparkline 1402 representing a data source including a null or blank value has changed in comparison with that of FIG. 13. Specifically, a cell 1404 in column C 1406 and row 3 1408 now includes a blank or null value. In the implementation depicted in FIG. 14, the null value is treated as a zero and the sparkline 1402 includes a zero value 1410 for the period represented.

FIG. 15 is a screen view of the application of FIG. 13 in which a null or blank value is ignored and the line graph interpolates between adjacent non-null data points. Once again, a cell 1504 in column C 1506 and row 3 1508 now includes a blank or null value. In the implementation depicted in FIG. 15, the null value for one of the data points is ignored and a line 1510 connects the adjacent data points, interpolating between those data points.

Figure 16:
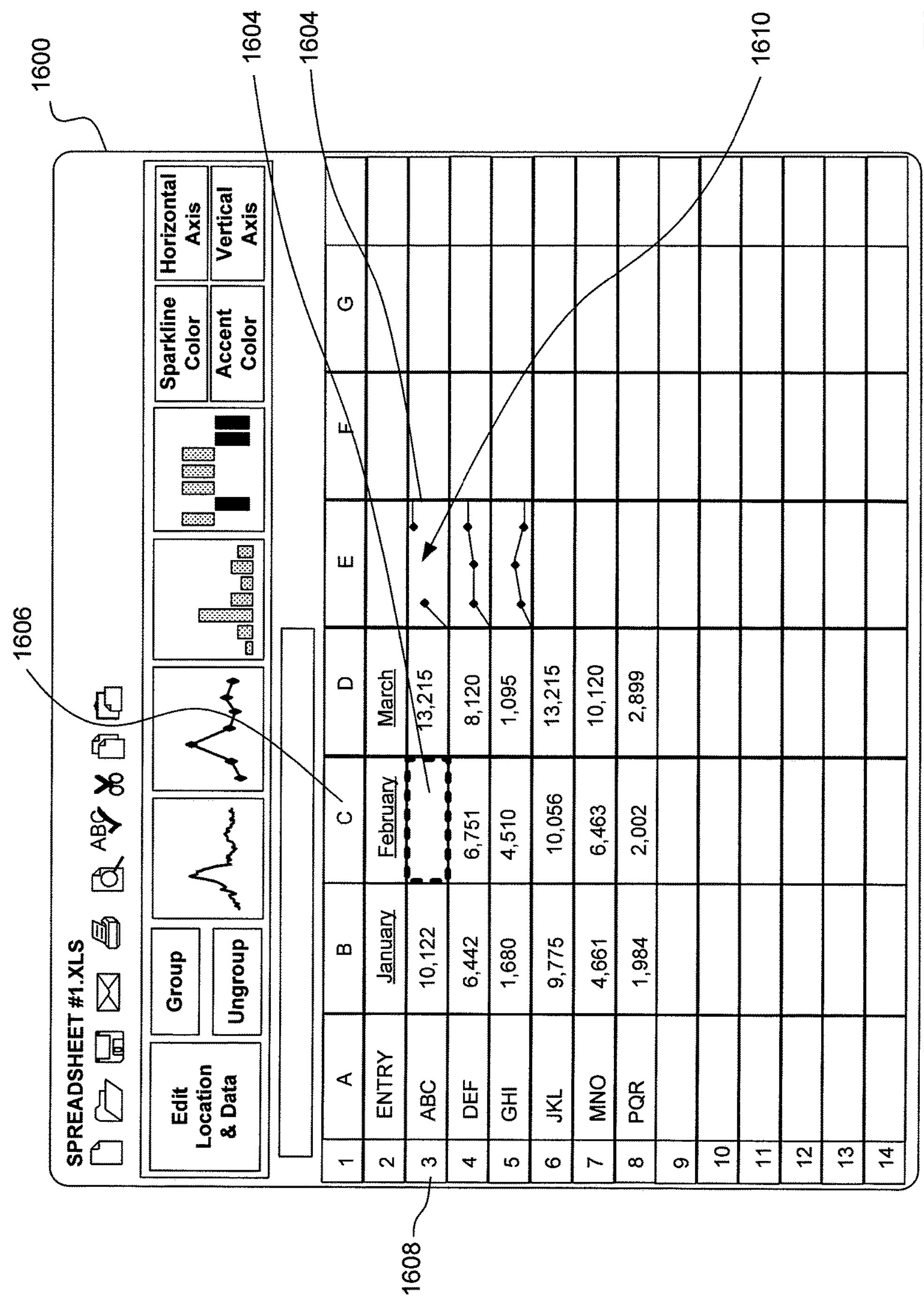

FIG. 16 is a screen view of the application of FIG. 16 in which a null or blank value is ignored and the line graph leaves a blank for null data points. Once again, a cell 1604 in column C 1606 and row 3 1608 now includes a blank or null value. In the implementation depicted in FIG. 16, the null value for one of the data points is treated as a null point and thus leaves a gap or null space 1610 in the resulting sparkline.

Implementations of the present disclosure include recognition of date ranges or other types of data ranges to automatically recognize gaps in the data to be represented by a sparkline. As a result, a skipped point or period will not be overlooked.

Figure 17:
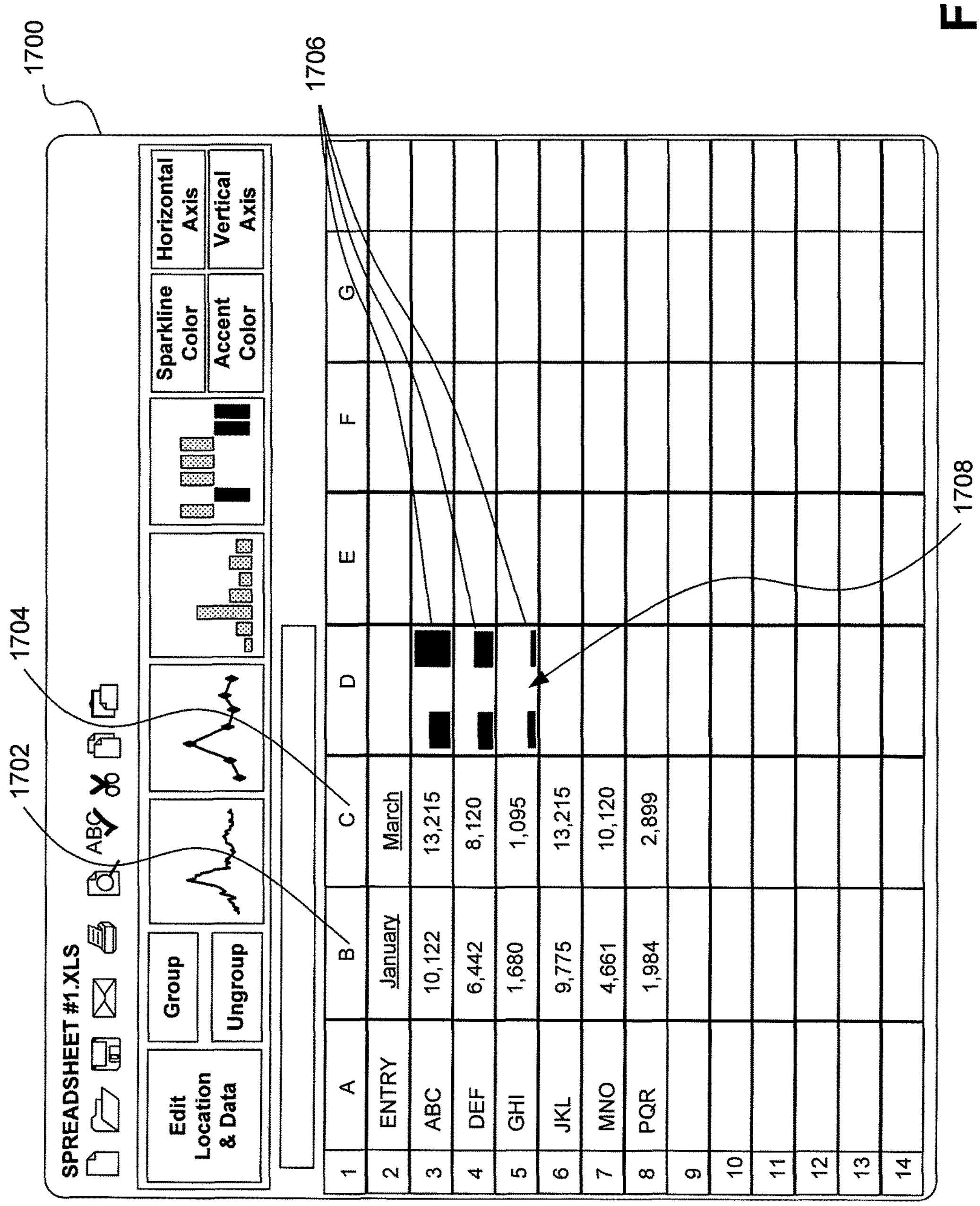

FIG. 17 is a screen view 1700 of the application of FIG. 9 except that there are only two columns of data: a column for January 1702 and a column for March 1704. No column for February is included as a result of data not being available, by omission, or for another reason. As previously mentioned with reference to FIG. 3, implementations of the present disclosure may be configured, as a matter or default and/or user preferences, to recognize when a set of data represents a time period and, thus, automatically recognize gaps in the data for the time period.

The screen view 1700 recognizes the gap in the covered period between the data for January 1702 and the data for March 1704. Consequently, the resulting sparklines 1706 each include a zero-value to indicate that February is not represented. Thus, the sparklines reflect that a period is missing.

Movement and Copying of Data Sources and/or Sparklines

As previously described, implementations of the present disclosure may use relative or absolute references so that sparklines will or will not represent different data when one or the other is moved. However, because sparklines are associated with data sources that include a group of data values, implementations of the present disclosure are configured to respond to conditions when a single data value as opposed to a whole data source is moved.

Figure 18:
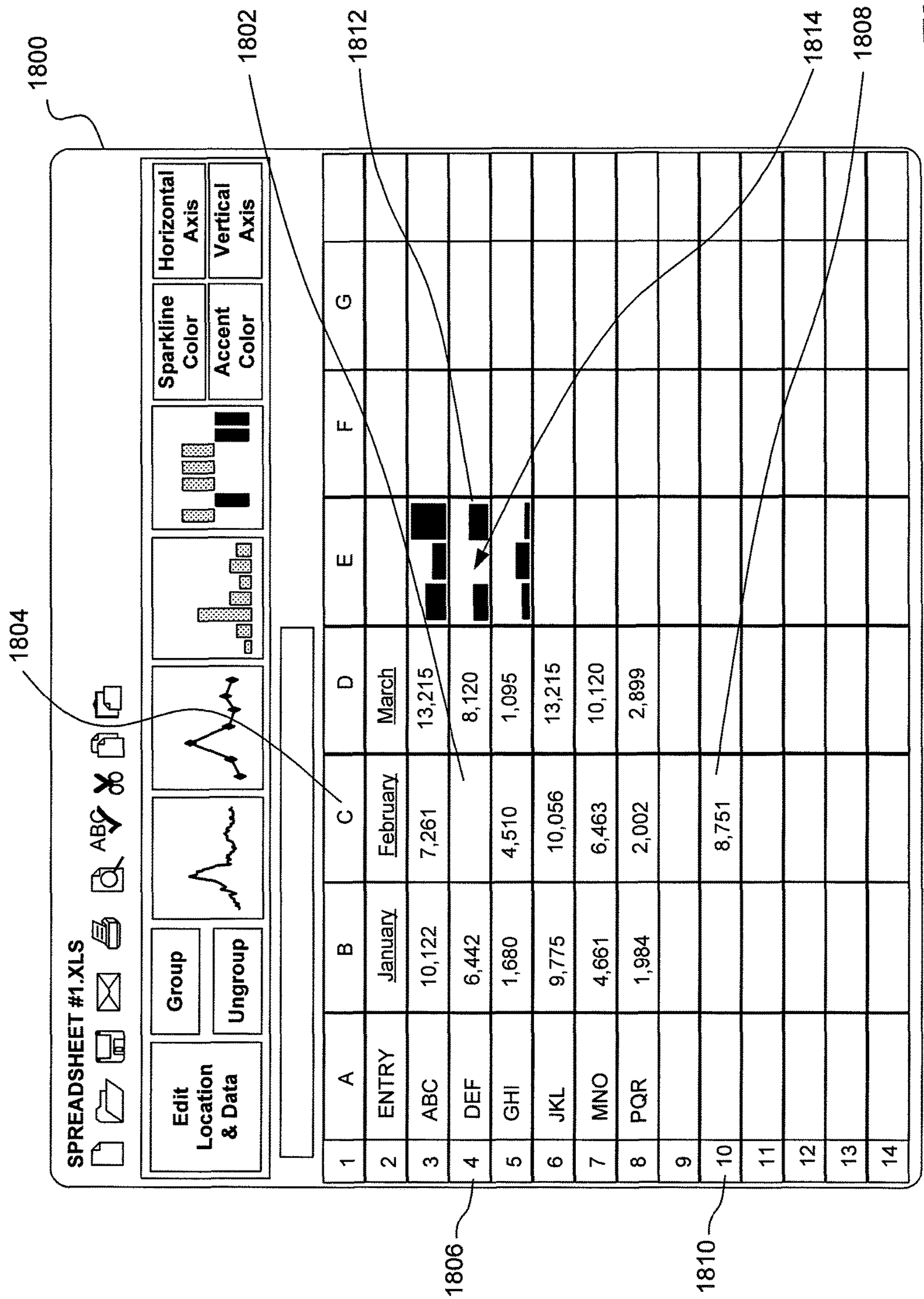

FIG. 18 is a screen view 1800 of the application of FIG. 9 in which the data value in cell 1802 in column C 1804 and row 4 1806 is copied to a new cell 1808 that is also in column C 1804 but in row 10 1810. By contrast with FIG. 9, the sparkline 1812 representing the data source of row 3 1806 now includes a null space 1814 in the sparkline 1812 reflexive of the null data value now in cell 1802. Although one of the data values was moved, the data source as a whole remained in its original location, so the movement of the value formerly in cell 1802 was considered a change in the data value in cell 1802.

Figure 19:
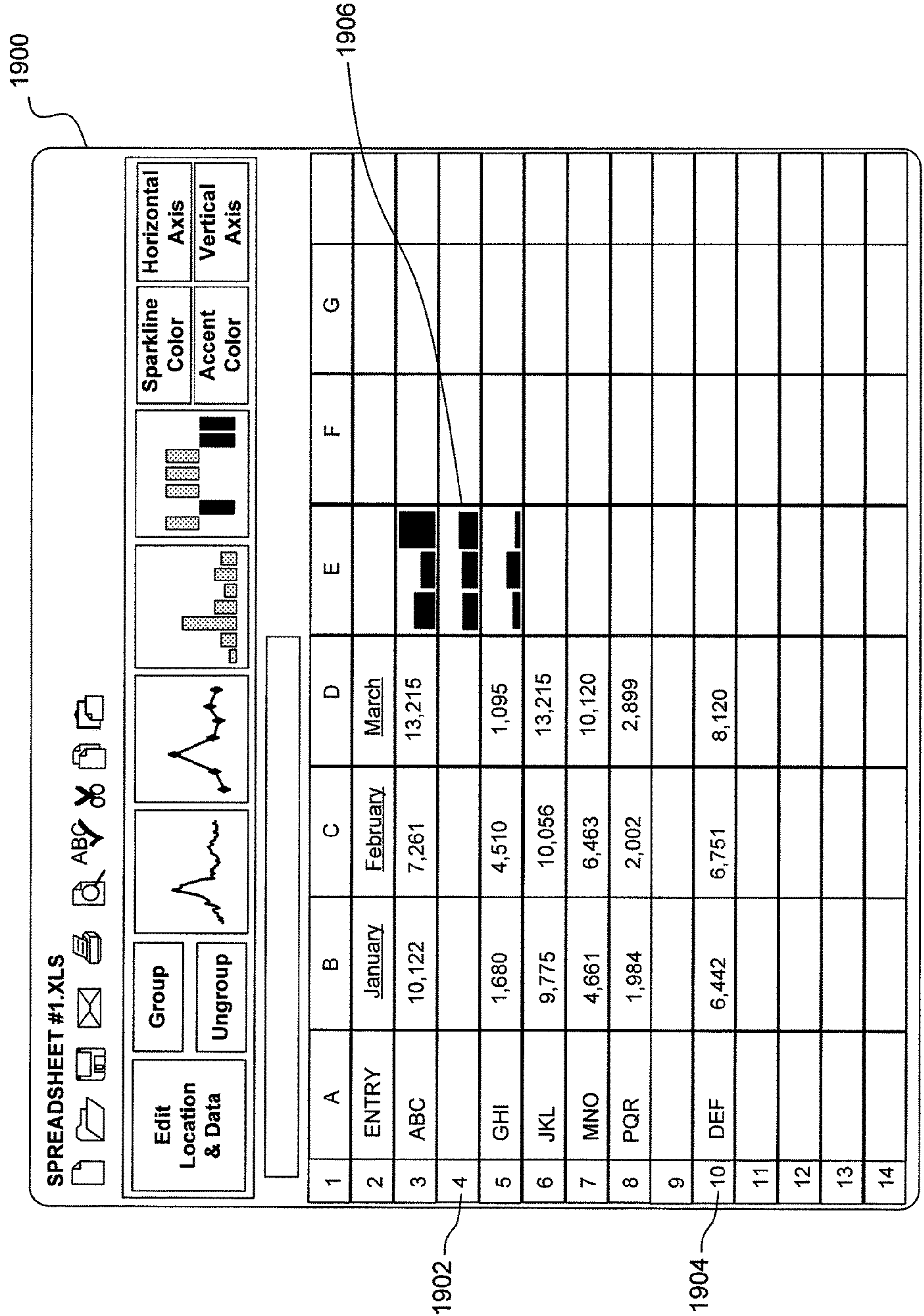

FIG. 19 is a screen view 1900 in which, by contrast, an entire data source associated with a sparkline is moved. Specifically, in comparison with FIG. 9, the screen view 1900 shows all of the data values previously residing in row 4 1902 being moved to row 10 1904. In the implementation illustrated by FIG. 19, it is assumed that the sparkline of cell 1906 was associated with the data source but the sparkline was fixed to the cell 1906. As a result, when the data source moves and/or is changed, the sparkline of cell 1906 remains associated with the moved data source. Whether the sparkline remains at its previous location, however, may depend on whether the sparkline itself was moved when the data source with which it is associated is moved.

Figure 20:
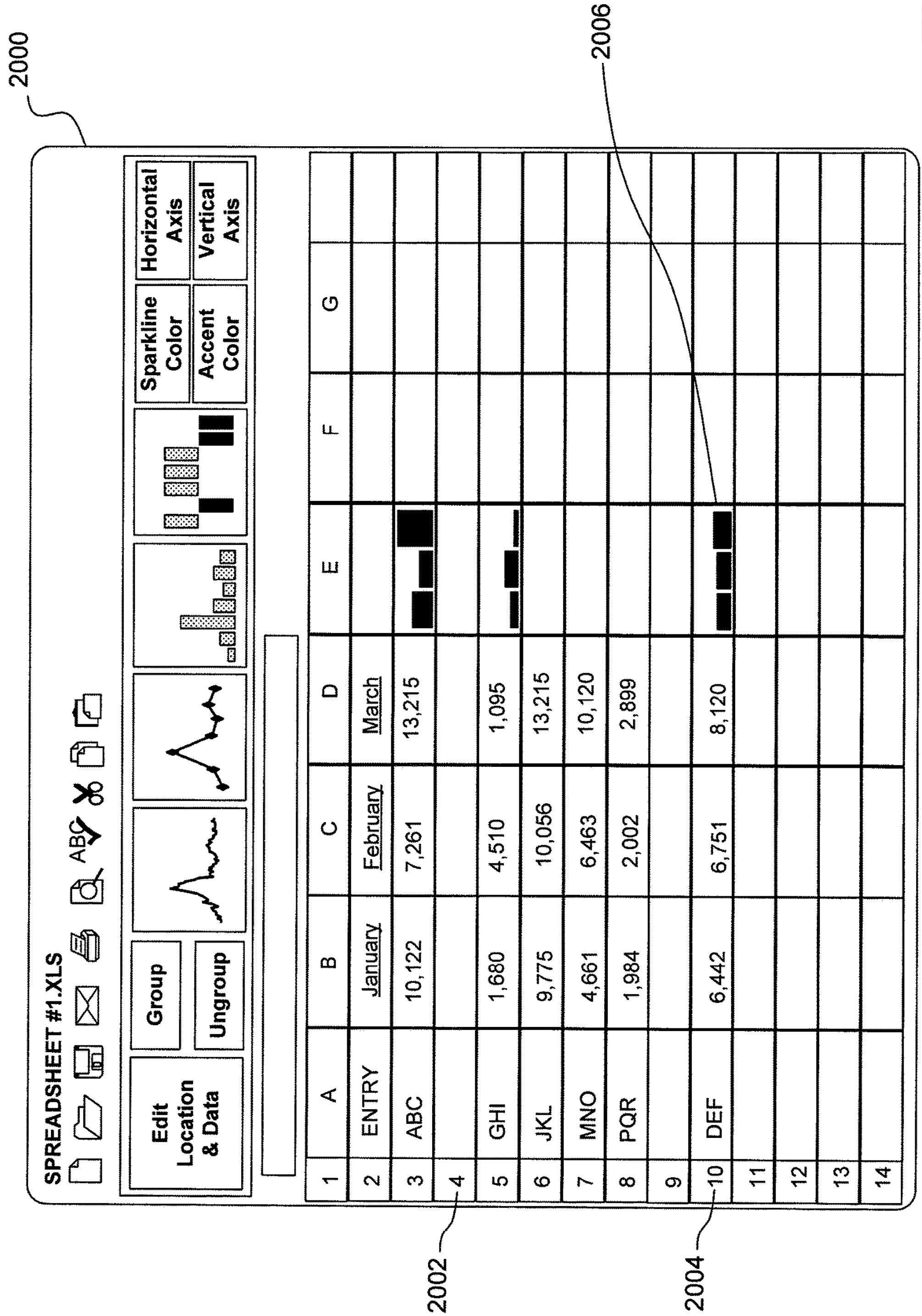

FIG. 20 is a screen view 2000 in which, once again, the data values previously residing in row 4 2002 are moved to row 10 2004. However, by contrast with FIG. 19, the sparkline 2006 associated with the relocated data source moves to row 10 2004 with its data source. Implementations of the present disclosure thus allow for flexibility in whether a sparkline remains in place but associated with its data source or the sparkline moves with its data source. Alternatively, although not shown, if the sparkline is defined using relative references, when the data source is moved, the sparkline may continue to refer to the same data locations. Thus, in the foregoing examples, the sparkline would show a blank graph in which all of the values are zero. Implementations of the present disclosure allow sparklines to be associated with their data sources in any number of ways as a matter of default and/or user preferences.

Figure 21:
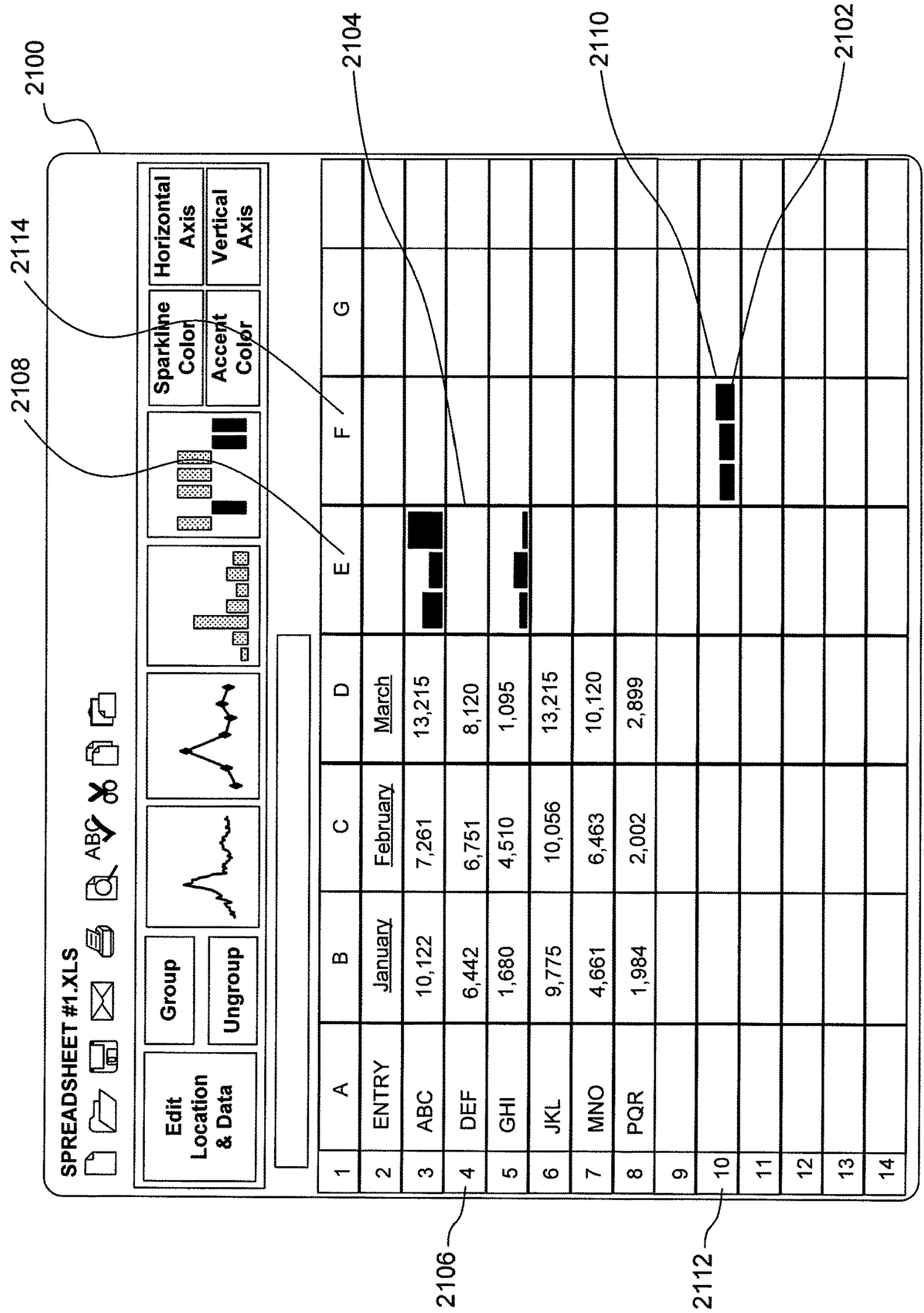

FIG. 21 is a screen view 2100 in which the data values and the data source remain in their original location but the sparkline 2102 associated with the data source is relocated from its original cell 2104 row 4 2106 and column E 2108 to a new cell 2110 in row 10 2112 and column F 2114. The sparkline 2102 in this example does not change, continuing to represent the data value in its data source.

Figure 22:
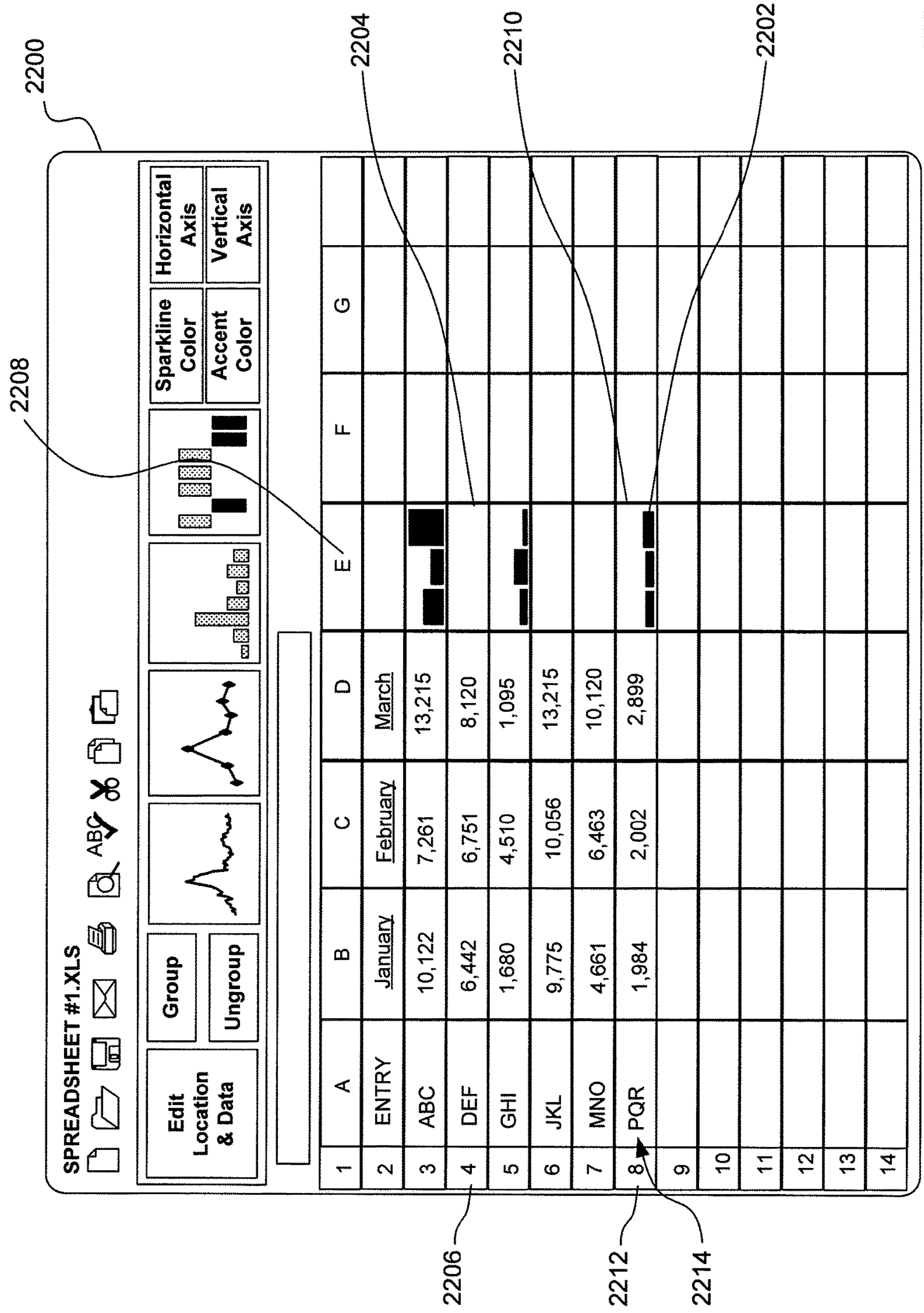

FIG. 22 is a screen view 2200 in which only a sparkline 2202 alone, without its data source, is moved from its original cell 2204 in row 4 2206 and column E 2208 to a new cell 2210 in row 8 2212 and column E 2208 where a different data source 2214 resides. In this implementation, when the sparkline 2202 is defined using relative references, moving the sparkline 2202 to a new location will result in the generation of a new sparkline based on the data values in the new data source 2214 with which the sparkline 2202 has become associated by being moved.

As shown in the examples of FIGS. 18-22, implementations of the present disclosure provide flexibility in relocating data sources and/or associated sparklines.

Figure 23:
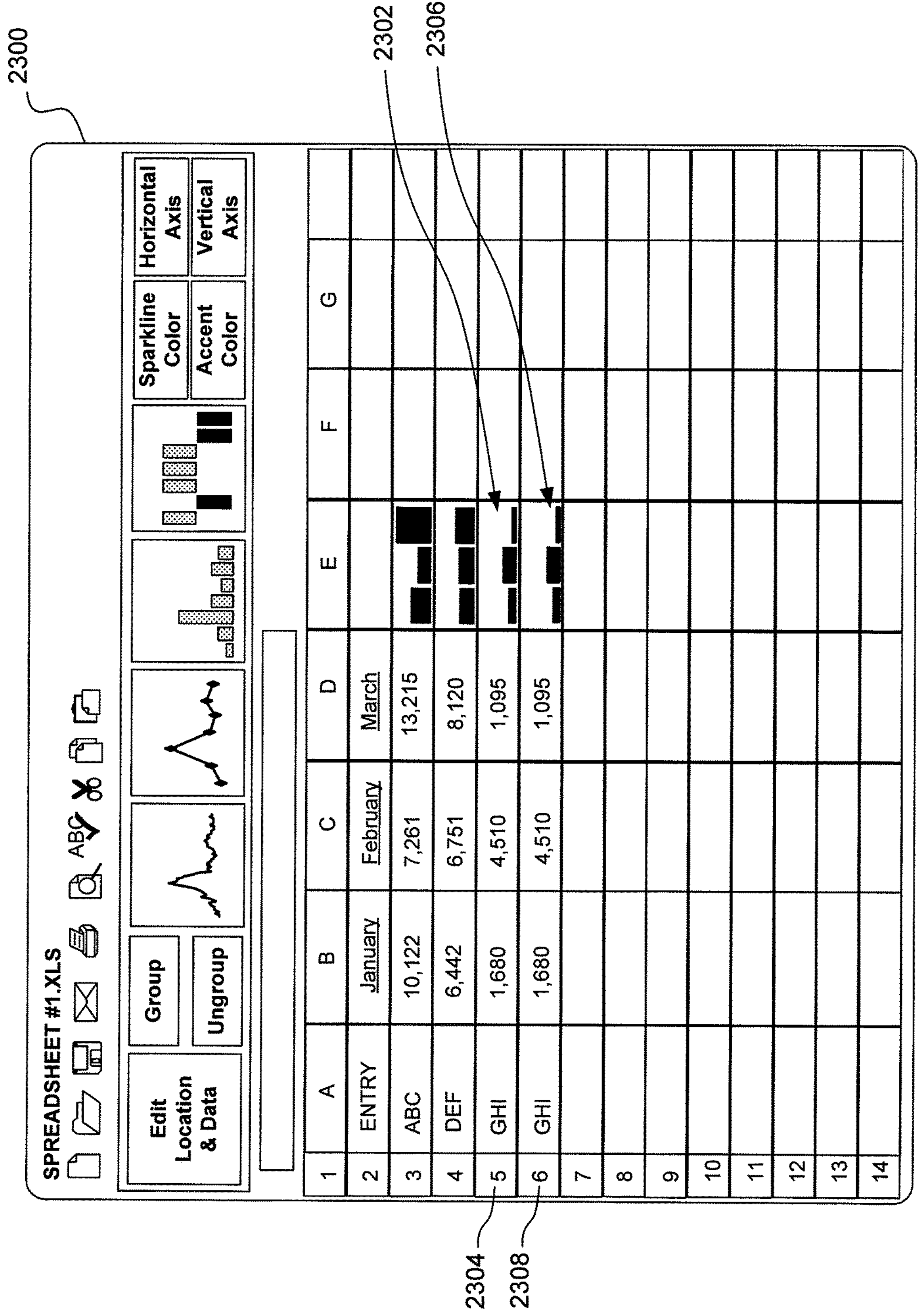

Implementations of the present disclosure also provide flexibility in the copying of sparklines and data sources. FIG. 23 is a screen view 2300 in which a data source and sparkline 2302 are copied from their original location in row 5 2304 to create a copy of the data source and sparkline 2308 in row 6 2308. When the sparkline is defined using relative references, and the data source and the sparkline are copied, a copy of the data source and the sparkline is made at another location, just as when a set of data and a formula may be copied in known spreadsheet applications.

Figure 24:
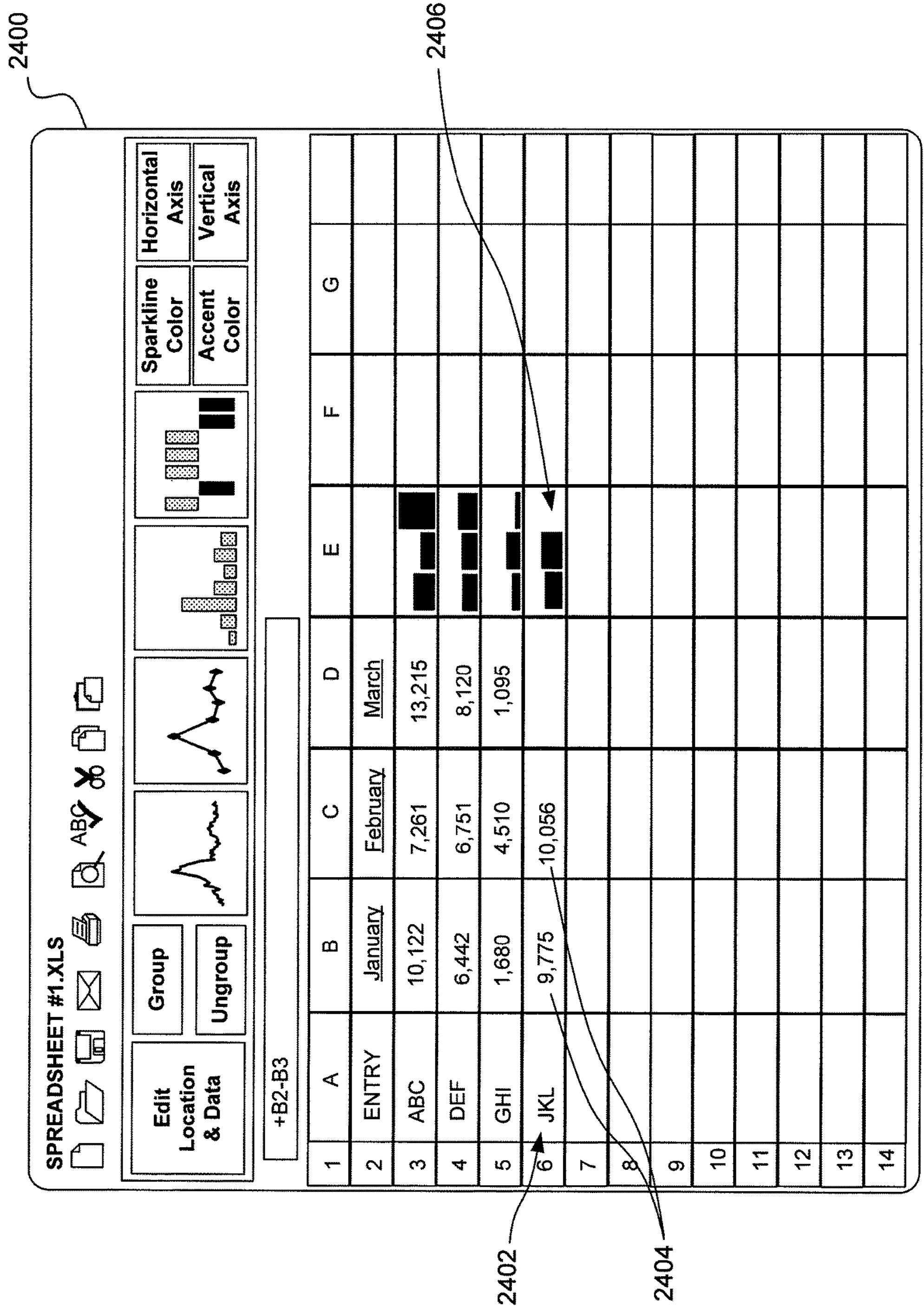

FIG. 24 is a screen view 2400 showing the modification of the copy of the data source and the sparkline 2402 made in FIG. 23. As the data values 2404 in the copy of the data source and sparkline 2402 are made, the sparkline 2406 is automatically regenerated to reflect the changing data values. Thus, the creation of a sparkline to represent a data source can be easily replicated to be associated with and thus represent different data sets.

Figure 25:
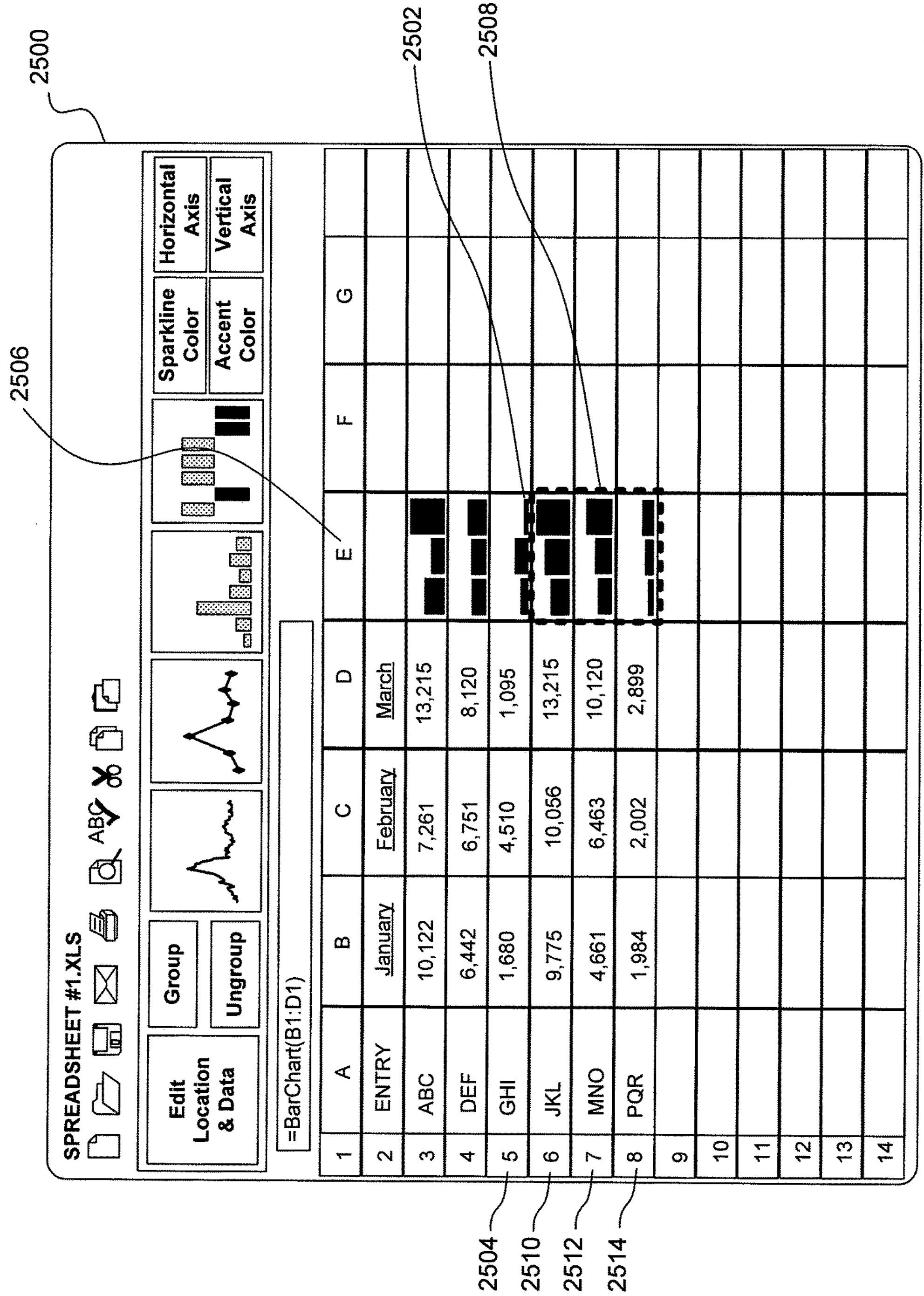

FIG. 25 is a screen view 2500 showing that, in same way as shown in FIG. 24, a sparkline may be copied to a range of locations or cells. Specifically, FIG. 25 shows a sparkline 2502 in a cell in row 5 2504 and column E 2506 being copied to a range of cells 2508 including row 6 2510, row 7 2512, and row 8 2514 in column E 2506. Each of row 6 2510, row 7 2512, and row 8 2514 includes a set of data values representing a new data source. Copying the sparkline 2502, assuming the sparkline 2502 is defined with relative references, to the range of locations or cells 2508 replicates the sparkline for each of the new data sources and each of the sparklines in the range of locations or cells is regenerated to represent the new data values with which each is associated.

Generation of Sparklines to a Scale of an Associated Location

Implementations of the present disclosure generate sparklines according to a location associated with the sparkline by generating a matrix of points to represent the sparkline. In one implementation, the sparkline is generated to a matrix of points sized to location where the sparkline is to be presented. In another implementation, the sparkline is generated to a standard matrix and scaled to a matrix of points sized to the location where the sparkline is presented.

Figure 26:
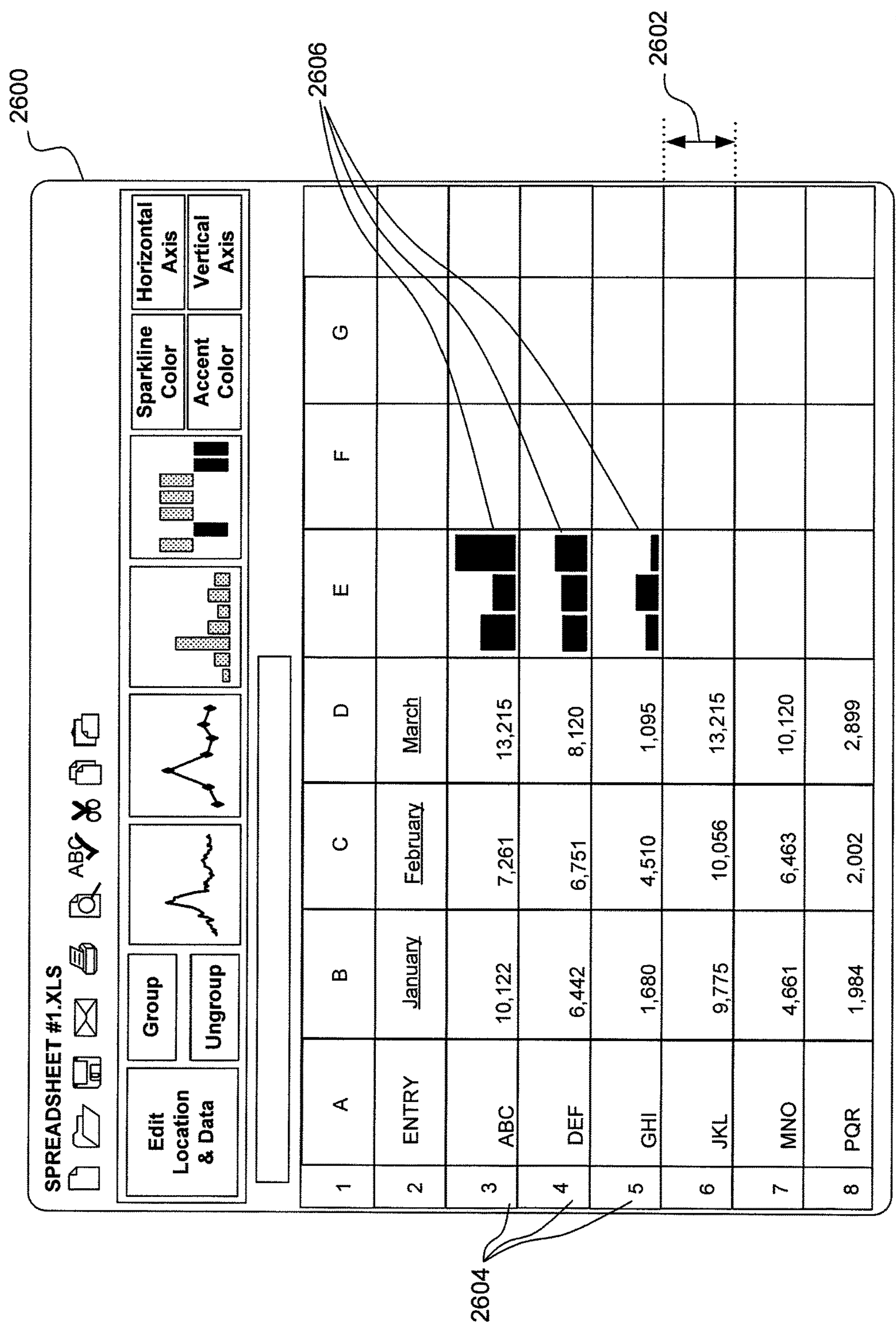

FIG. 26 is a screen view 2600 in which the same data values and sparklines as presented in FIG. 9 are presented. However, in contrast to FIG. 9, in the screen view 2600 of FIG. 26, a row height has been increased for the data sources and the sparklines. As a result, the sparklines in the screen view 2600 have a larger vertical scale. Generating the sparklines as a matrix of points allows for the sparklines to be generated to appropriately map to the location associated with the sparkline.

Figure 27:
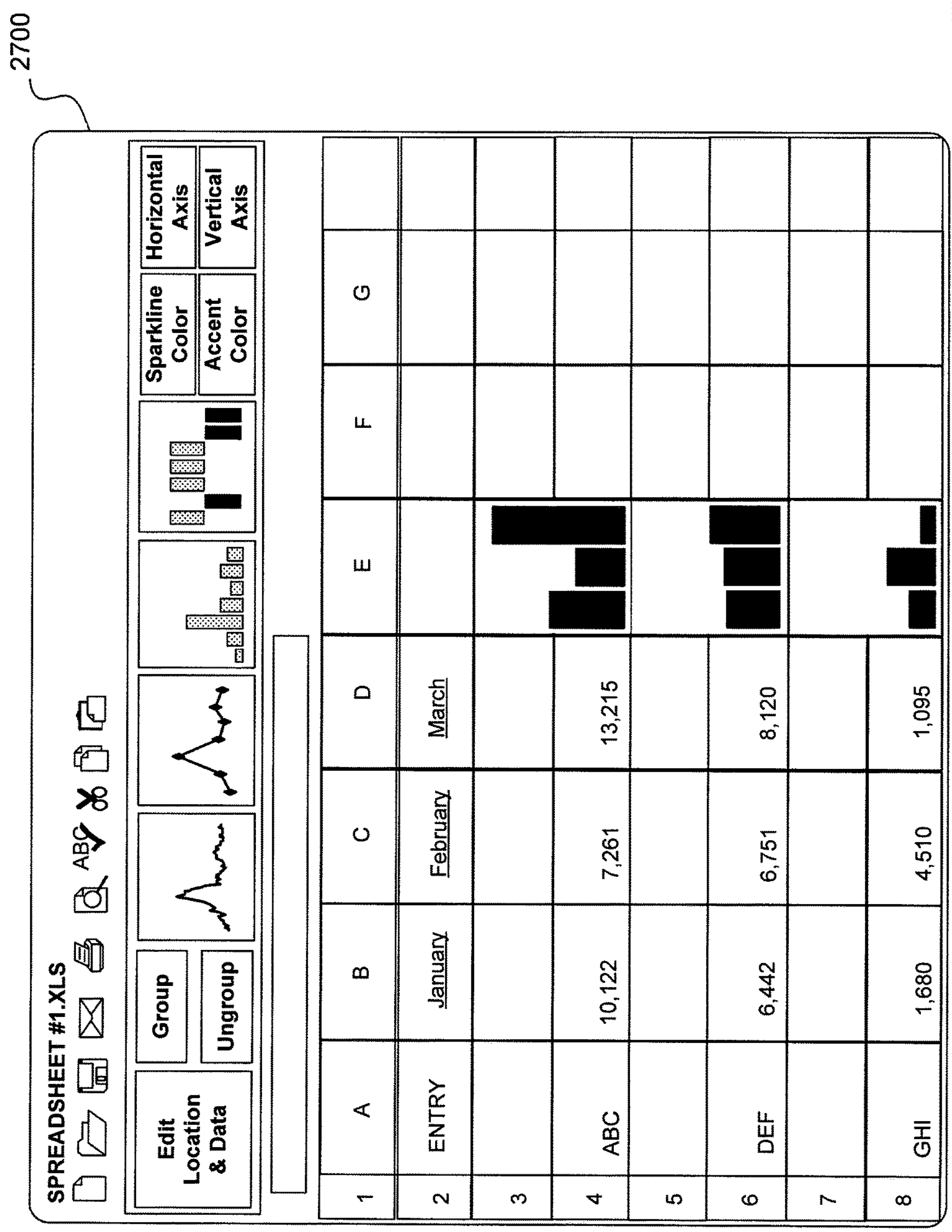

Correspondingly, FIG. 27 is a screen view 2700 in which multiple cells have been merged to create a larger presentation location for presentation of the sparklines 2702 than for the rows in which the data sources 2704 are presented. With a larger presentation location available, the sparklines 2702 are generated or scaled to utilize the available presentation space independent of the space allocated to the respective data sources for the sparklines 2702.

Implementations of the present disclosure provide for generating or scaling the sparklines whether a larger or a smaller presentation location is made available or the sparkline is moved to a larger or smaller presentation location. Also, while the foregoing examples of FIGS. 26 and 27 illustrate the sparklines being generated or scaled to take advantage of additional vertical space, the sparklines may be generated or scaled for changing horizontal dimensions as well. The sparklines may respond to changes in the size of individual locations, changes in groups of locations, or changes in an entire document format.

Figure 28:
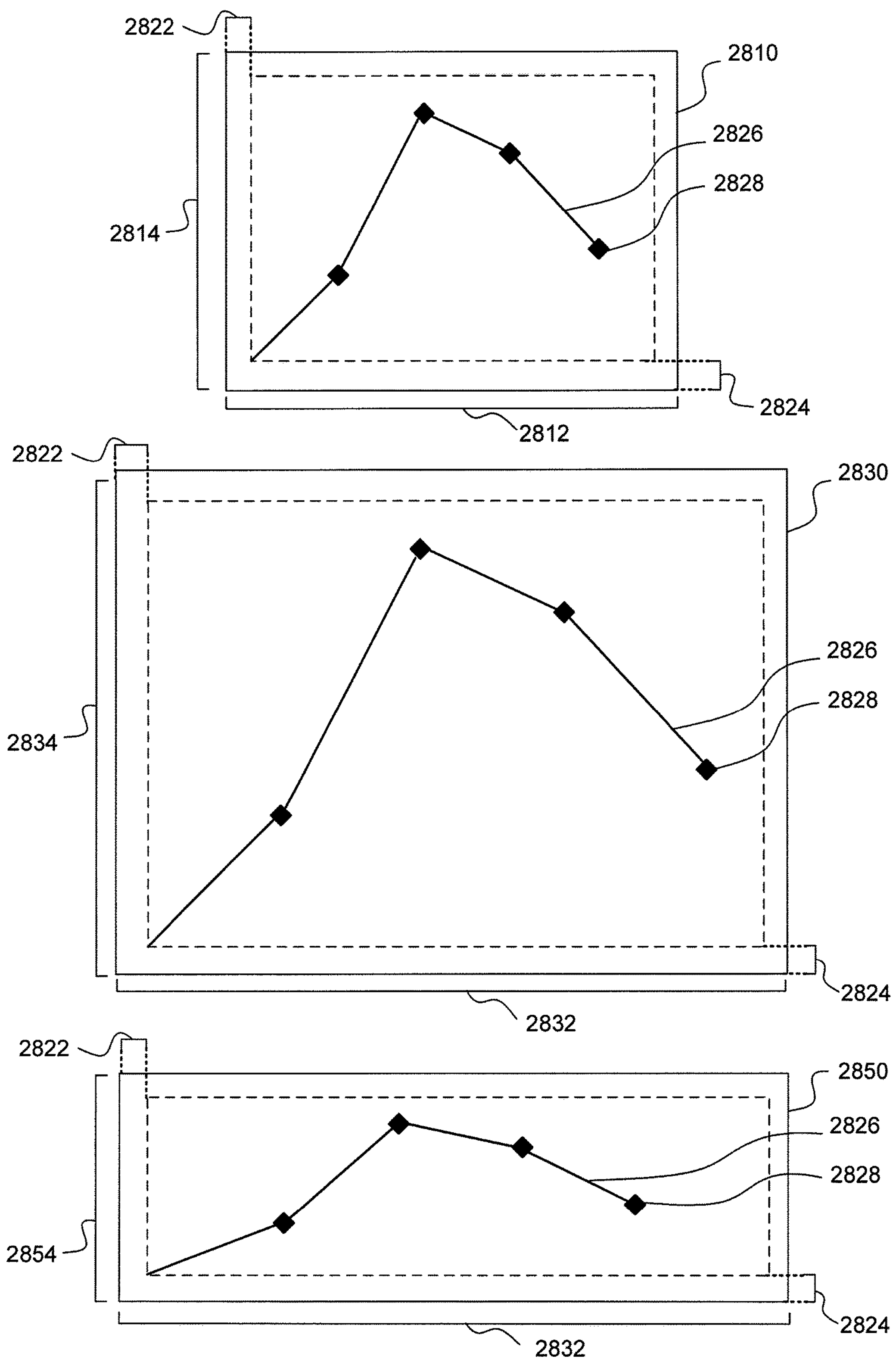
FIGS. 28 and 29 is a graphical views of generating a sparkline for associated locations according to implementations of the present disclosure.

FIG. 28 illustrates differently sized line graph-type sparklines generated to represent the same data source differently sized locations in order to preserve one or more presentation attributes regardless of the size of the location where the sparkline will be presented. For example, in generating sparklines, users may wish to preserve any number of presentation attributes including, but not limited to, a margin size between an outside of the sparkline and one or more edges of a perimeter of the associated location, a sparkline color, a background color, a sparkline pattern, a background pattern, a highlight applicable to one or more qualifying data values, a line thickness, a line pattern, a value marker format, or other parameters.

FIG. 28 shows sparkline generation (or regeneration) for three differently sized locations where the sparkline will be presented, location 1 2810, location 2 2830, and location 3 2850. Although the horizontal and/or vertical dimensions are different for each of the locations, in this example, four presentation attributes are preserved: the horizontal margin 2822, the vertical margin 2824, the line thickness 2826, and the value marker dimensions 2828. (Although different left and right horizontal margins and different top and bottom margins may be used, for purposes of this example, it is assumed that there is only one horizontal margin size and one vertical margin size.)

Location 1 2810 has a width 1 2812 and height 1 2814. Location 2 2830 has a width 2 2832 and a height 2 2834. Location 3 2850 has a width 2 2832—the same as location 2 2830—and a height 3 2854. The varying dimensions of the locations affect the height and width of the resulting sparkline presented in each location. However, implementations of the present disclosure generate the sparkline to preserve the presentation attributes including the horizontal margin 2822, the vertical margin 2834, the line thickness 2836, and the value marker dimensions 2838. Thus, even as dimensions of one or more cells or locations changes, presentation attributes may be preserved.

Figure 29:
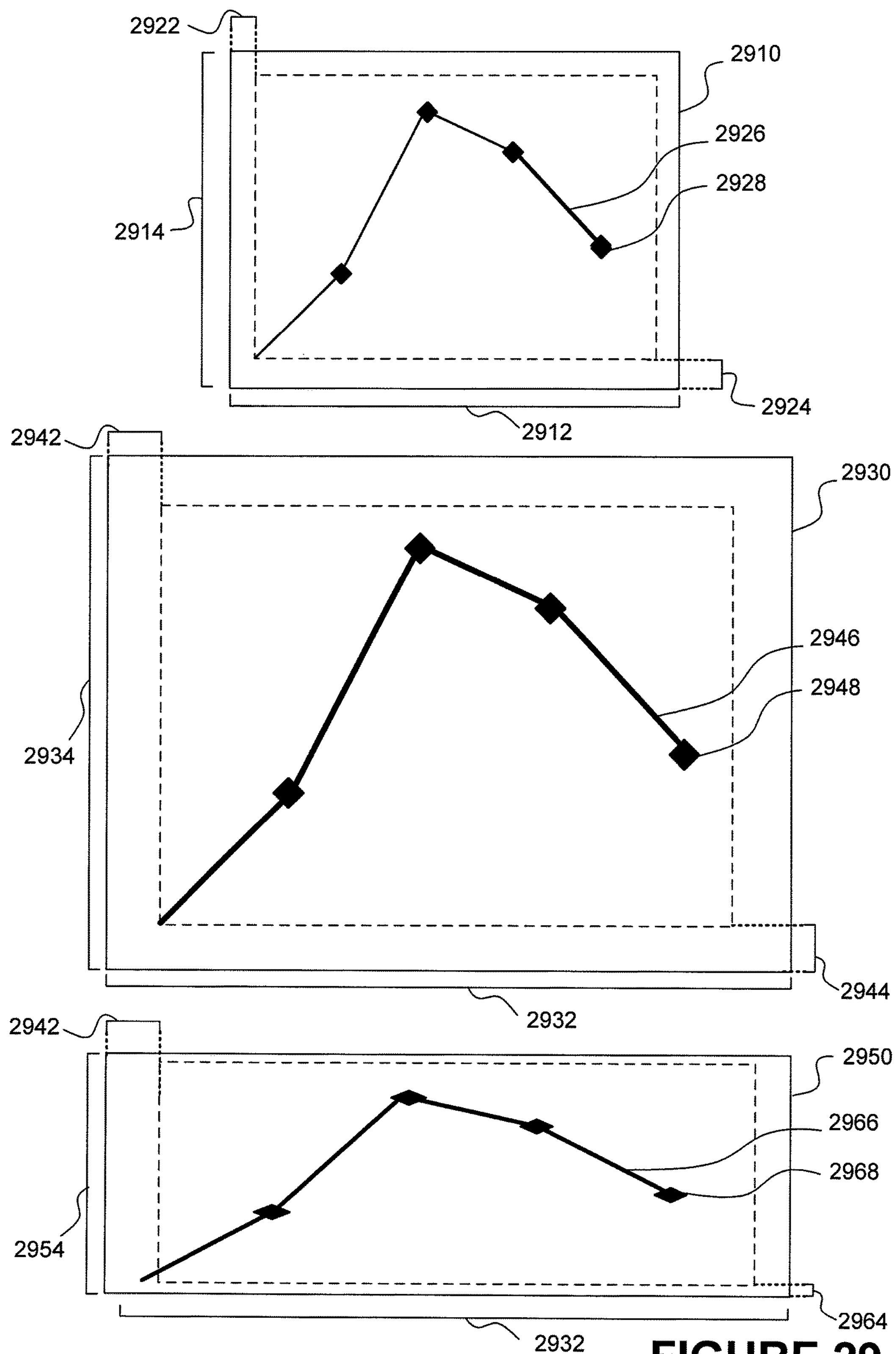

Alternatively, if the preservation of presentation attributes is not prioritized or not prioritized strongly, sparklines may be generated to a standard size matrix of points and then scaled to fit a location size. FIG. 29 illustrates this alternative.

In FIG. 29, sparkline 1 2910 is a line graph-type sparkline generated to a standard-sized matrix with width 1 2912 and height 1 2914. The standard-sized matrix includes horizontal margin 1 2922, vertical margin 1 2924, line thickness 1 2926, and value marker size 1 2928.

From the standard-sized matrix, the sparkline 1 2910 may be scaled to sparkline 2 2930 having width 2 2932 and height 2 2934. Width 2 2932 and height 2 2934 are both larger than width 1 2912 and height 1 2914. The sparkline 2930 represents the same information as sparkline 2910, but presentation attributes from scaling the sparkline 2910 will result in the horizontal margin 1 2922 changing to larger horizontal margin 2 2942, vertical margin 1 changing to larger vertical margin 2 2944, line thickness 1 2926 changing to larger line thickness 2946, and value marker size 1 2928 changing to larger value marker size 2 2948. If the change in the presentation attributes is acceptable, the scaling of the image may be less resource-intensive than regenerating the sparkline to a newly sized location.

However, depending on the size of the new location, scaling a sparkline generated for a standard-sized matrix may be less desirable. For example, sparkline 3 2950 has the same width 2 2932 as sparkline 2 2930 but a shorter height 3 2954. As a result, the aspect ratio of the sparkline changes. The horizontal margin 2 2942 is the same, but the vertical margin 3 2964 is smaller. The line thickness 3 2966 and the value marker size 3 2968 will be compressed in a vertical dimension as compared to those of sparkline 2 2930. Scaling a standard image may be less resource intensive to generate or regenerate, but not as desirable in appearance.

Portability of Sparklines

Figure 30:
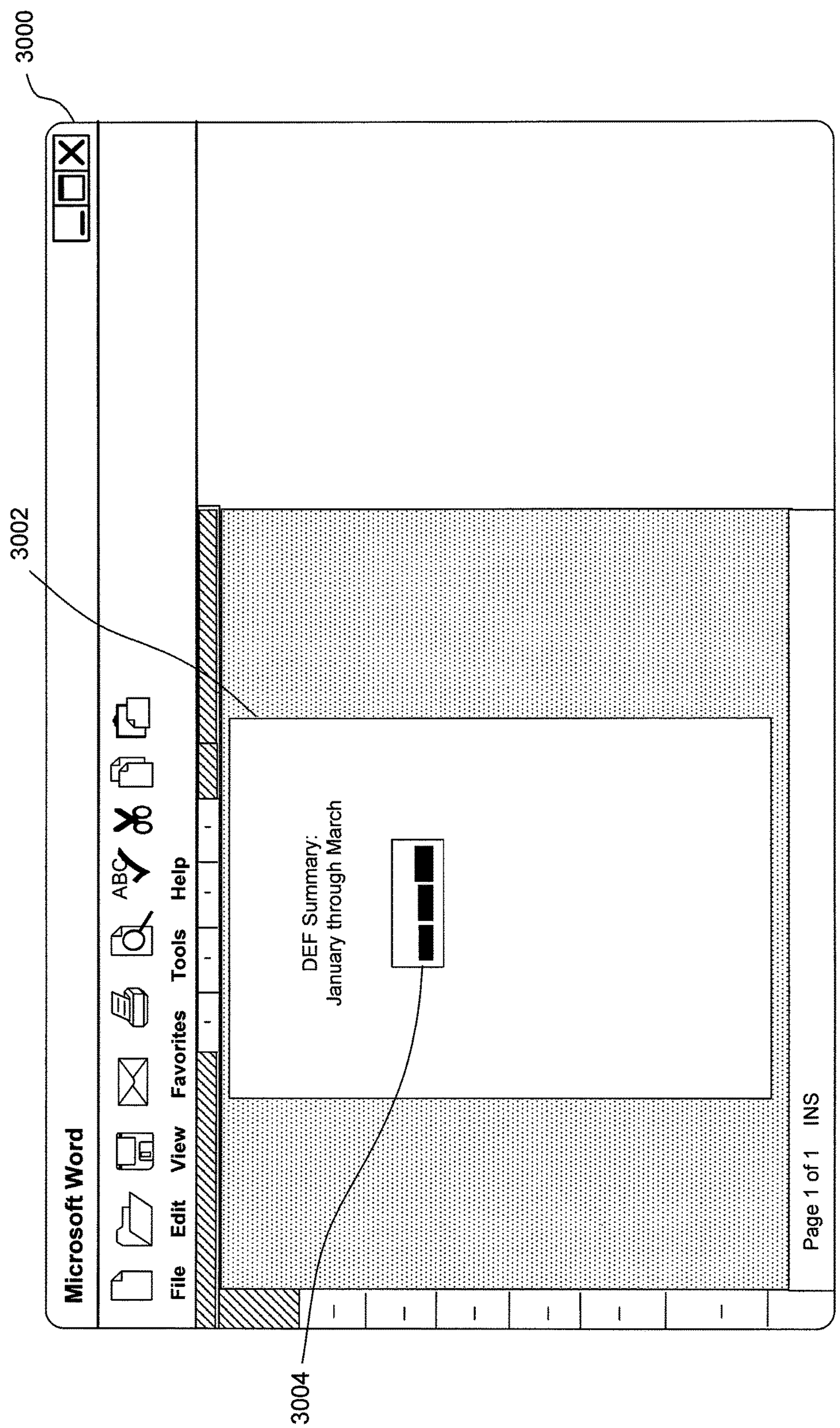
FIG. 30 is a screen view of a second application to which a sparkline has been copied from an application in which it was created.

It may be desirable to be able to move, copy, or otherwise export a sparkline image to a second application or document to provide the visual representation presented by the sparkline. For example, FIG. 30 shows a screen view 3000 of a text document 3002 in a word-processing application. In the text document, it may be desirable to incorporate the sparkline as a visual representation of information, with or without including the data from which the sparkline is generated.

The image presented by a sparkline may be copied and/or scaled as desired to fit a location in the second application. Unlike, for example, a sparkline generation system that uses a special set of fonts that either may not be recognized by the second application or that will not result in a coherent, continuous image, implementations of the present disclosure generate an image that is portable to other applications.

Process of Generating Sparklines

Figure 31:
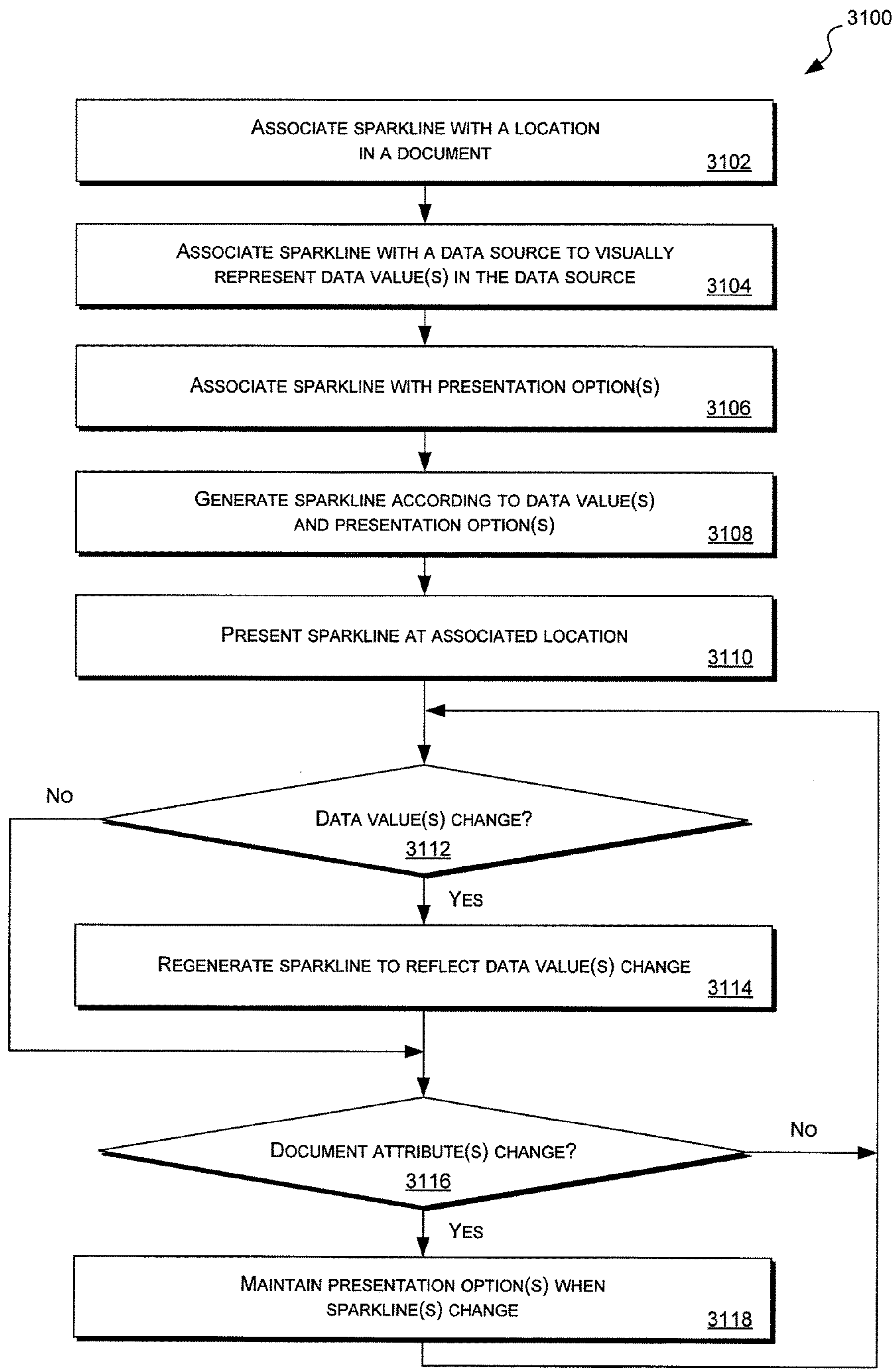
FIG. 31 is a flow diagram of a process for generating a sparkline according to the present disclosure.

FIG. 31 is a flow diagram 3100 of an implementation of the present disclosure. Specifically, the flow diagram 3100 describes a process for generating and regenerating sparklines from an associated data source that is appropriate to a location associated with sparkline.

At 3102, the sparkline is associated with a location in a document. At 3104, the sparkline is associated with a data source to visually represent the value in the data source. At 3106, the sparkline is associated with one or more presentation options that affect the appearance of the resulting sparkline. The processes of 3102-3106, however, may be performed in a different order or may be performed by default. As previously described, a default location for a sparkline may be inferred from the location of the data source or vice versa. Similarly, the presentation attributes or options, for example, may be set by default but can be modified once the sparkline is generated.

At 3108, the sparkline is generated according to the data values and/or the presentation options. Generation of a graphic representation of data by a charting engine is understood by those skilled in the art of computer graphics. Nonetheless, it was not previously known to using such a charting engine to generate sparklines in a grid of a document such as a spreadsheet document. At 3110, the sparkline is presented at the location associated with the sparkline.

At 3110, it is determined if any of the data values included in the data source from which the sparkline was generated have changed. If so, at 3114, the sparkline is regenerated to reflect the change in the one or more data values.

Once the sparkline has been regenerated because of a data value change or if no data values have changed, at 3116, it is determined if any document attributes have changed that would affect the presentation of the sparkline. The document attribute change may include a change just for the associated location where the sparkline is presented, a change for parts of the document affecting the associated location, or changes to the whole document. If it is determined at 3116 that such document attributes have changed, in one implementation, at 3118, the presentation options are maintained even when the sparkline changes.

Maintaining presentation options or attributes was described with reference to FIG. 28. Alternatively, as also previously described, if preserving or maintaining presentation options or attributes is not prioritized or selected, 3116 and 3118 may be omitted. The process of flow diagram 3100 may be repeated and continued as desired for generating and regenerating all desired sparklines.

The above specification, examples and data provide a complete description of the manufacture and use of the composition of the invention. Because many embodiments of the invention can be made without departing from the spirit and scope of the invention, the invention resides in the claims hereinafter appended.

We claim:

1. A computer-implemented method, comprising:

receiving a selection of a group of cells that are arranged in a grid within a document;

identifying data sources from the group of cells wherein each data source includes data values;

grouping the data sources into a group of data sources based on the selection of the group of cells;

receiving a selection of locations in the document to display a group of sparklines using the data values corresponding to the group of data sources;

associating each sparkline within the group of sparklines with one or more presentation options;

automatically forming the group of sparklines;

graphically displaying each sparkline for each of the data sources according to the data values and the one or more presentation options by generating each sparkline based on the data values with a matrix of points proportional to an associated location in the document;

presenting each sparkline at the associated location in the document, wherein each sparkline in the group of sparklines maintains a link to the corresponding data source;

receiving a first selection to modify a sparkline in the group of sparklines;

based on the first selection, modifying each of the sparklines in the group of sparklines;

receiving a second selection to ungroup a sparkline from the group of sparklines such that the ungrouped spakline is selectable separate from the group of sparklines, and wherein modifying the ungrouped sparkline applies to the ungrouped sparkline; and automatically rescaling and presenting a sparkline on the same document along with a corresponding data source upon changing a data value in the corresponding data source.

2. The computer-implemented method of claim 1, further comprising receiving a selection to ungroup a data source included within the group of data sources such that a change applied to one of the sparklines in the group of sparklines remains unapplied to the ungrouped data source.

3. The computer-implemented method of claim 1, further comprising superimposing additional content in the associated location, wherein:

a sparkline is presented in a foreground of the associated location of a same graphical window relative to the additional content such that the additional content is viewable where the additional content is not overlapped by the sparkline;

the sparkline is presented in a background of the associated location of the same graphical window relative to the additional content such that the sparkline is viewable where the sparkline is not overlapped by the additional content; and one or more of the sparkline and the additional content is at least partially transparent to allow the sparkline and the additional content both to be viewable when the sparkline and the additional content overlap within the same graphical window.

4. The computer-implemented method of claim 1, wherein the visual representation includes one or more of:

a line graph;

a line graph with value markers;

a bar graph;

a stacked bar graph;

a win/loss graph; and a pie chart.

5. The computer-implemented method of claim 1, wherein the presentation options include one or more of:

a margin size between an outside of each sparkline and one or more edges of a perimeter of the associated location;

a sparkline color;

a background color;

a sparkline pattern;

a background pattern;

a highlight applicable to one or more qualifying data values;

a line thickness;

a line pattern; and a value marker format.

6. A computer-implemented method, comprising:

receiving a selection of data sources within a document, wherein each data source comprises values that is represented by a sparkline;

automatically grouping the data sources into a group of data sources;

automatically grouping sparklines corresponding to the group of data sources into a group of sparklines;

associating each of the sparklines in the group of sparklines with a location in a document to provide a visual representation of data values included in a corresponding data source;

automatically forming the group of sparklines;

graphically displaying each of the sparklines in the group of sparklines by generating the visual representation based on the data values with a matrix of points to be presented at the associated location in the document;

presenting each of the sparklines at the associated location in the document such that each of the sparklines is linked to the associated data source;

receiving a first selection to modify a sparkline in the group of sparklines;

based on the first selection, modifying each of the sparklines in the group of sparklines;

receiving a second selection to ungroup a sparkline of the group of sparklines such that the ungrouped sparkline is individually selectable, and wherein modifying the ungrouped sparkline applies alone to the ungrouped sparkline; and automatically rescaling and presenting a sparkline on the same document along with a corresponding data source upon changing a data value in the corresponding data source.

7. The computer-implemented method of claim 6, further comprising:

associating each of the sparklines with one or more presentation options; and generating the sparklines according to both the one or more data values and the one or more associated presentation options.

8. The computer-implemented method of claim 7, wherein the presentation options include one or more of:

a margin size between an outside of each sparkline and one or more edges of a perimeter of the associated location;

a sparkline color;

a background color;

a sparkline pattern;

a background pattern;

a highlight applicable to one or more qualifying data values;

a line thickness;

a line pattern; and a value marker format.

9. The computer-implemented method of claim 6, further comprising superimposing additional content in the associated location, wherein:

a sparkline is presented in a foreground of the associated location relative to the additional content such that the additional content is viewable where the additional content is not overlapped by the sparkline;

the sparkline is presented in a background of the associated location relative to the additional content such that the sparkline is viewable where the sparkline is not overlapped by the additional content; and one or more of the sparkline and the additional content is at least partially transparent to allow the sparkline and the additional content both to be viewable when the sparkline and the additional content overlap.

10. The computer-implemented method of claim 9, wherein the additional content includes:

a formula;

text;

an image;

a location shading;

a location color; and an additional graphic representative of one or more quantities.

11. The computer-implemented method of claim 6, wherein the visual representation includes one or more of:

a line graph;

a line graph with value markers;

a bar graph;

a stacked bar graph;

a win/loss graph; and a pie chart.

12. The computer-implemented method of claim 6, wherein each of the data sources includes a range of cells in a spreadsheet document using one or more relative references such that:

a sparkline continues to represent the one or more data values included in a corresponding data source when one of the sparkline and the corresponding data source is moved; and a copy of the sparkline is created to represent data in a second data source when one of the sparkline is copied to an additional location and a second range of cells is inserted adjacent to the range of cells included in the data source.

13. The computer-implemented method of claim 6, further comprising automatically recognizing one or more null data values for an axis value of a sparkline and representing the one or more null values by any one of:

leaving a blank data point for the one or more null values;

treating the blank data point as a zero; and interpolating between non-null data values adjacent to the one or more null values.

14. The computer-implemented method of claim 6, wherein selection of attributes of at least one of the sparkline and the one or more presentation attributes are made through command interfaces displaying available options and displayed by a computing system supporting the computer-implemented method including one or more of:

one or more ribbon interfaces presented along one or more sides of the document;

one or more a dialog boxes presented one or more of alongside the document or superimposed over the document; and one or more menus presented one or more of alongside the document or superimposed over the document.

15. A computer-readable storage medium storing instructions executable by a computing system to generate one or more sparklines by:

identifying a group of three or more data sources within a spreadsheet document;

associating a group of three or more sparklines with the group of three or more data sources within the spreadsheet document, wherein each data source includes data values;

associating the group of three or more sparklines with one or more presentation options;

automatically forming the group of sparklines;

graphically displaying each sparkline of the group of three or more sparklines for each data source of the group of three or more data sources in accordance with the presentation options with a matrix of points to be presented in the spreadsheet document;

receiving a first selection to modify a first sparkline in the group of three or more sparklines;

based on the first selection, modifying a first sparkline, a second sparkline, and a third sparkline in the group of three or more sparklines;

ungrouping a second sparkline from the group of three or more sparklines such that the second sparkline is individually selectable;

receiving a second selection to modify the second sparkline in the group of three or more sparklines;

based on the second selection, modifying the second sparkline but not the first sparkline or the third sparkline; and automatically resealing and presenting a sparkline on the same spreadsheet document along with a corresponding data source upon changing a data value in the corresponding data source.

16. The computer-readable storage medium of claim 15, further comprising associating the first sparkline, the second sparkline, and the third sparkline with each of the three or more data sources with a cell location within the spreadsheet document using a relative reference such that:

the first sparkline continues to represent the one or more data values included in a corresponding first data source when the first sparkline and the corresponding first data source is moved; and a copy of the first sparkline is created to represent data in a second data source when the first sparkline is copied to an additional cell and a second range of cells is inserted adjacent to the range of cells included in the first data source.

17. The computer-readable storage medium of claim 15, further comprising superimposing additional content in a cell location, wherein:

a first sparkline is presented in a foreground of the cell location relative to the additional content such that the additional content is viewable where the additional content is not overlapped by the first sparkline;

the first sparkline is presented in a background of the cell location relative to the additional content such that the first sparkline is viewable where the first sparkline is not overlapped by the additional content; and one or more of the first sparkline and the additional content is at least partially transparent to allow the first sparkline and the additional content both to be viewable when the first sparkline and the additional content overlap.

18. The computer-readable storage medium of claim 15, wherein the visual representation includes one or more of:

a line graph;

a line graph with value markers;

a bar graph;

a stacked bar graph;

a win/loss graph; and a pie chart.

19. The computer-readable storage medium of claim 15, wherein the presentation options include one or more of:

a margin size between an outside of each sparkline and one or more edges of a cell location;

a sparkline color;

a background color;

a sparkline pattern;

a background pattern;

a highlight applicable to one or more qualifying data values;

a line thickness;

a line pattern; and a value marker format.

20. The computer-implemented method of claim 1, further comprising receiving a third selection to group again the ungrouped sparkline back into the group of sparklines.

* * * * *